| | | |
|---|---|---|
| (12) | United States Patent<br>Noda et al. | (10) Patent No.: US 10,954,818 B2<br>(45) Date of Patent: Mar. 23, 2021 |

(54) TURBOCHARGER AND ENGINE SYSTEM

(71) Applicant: MITSUBISHI HEAVY INDUSTRIES ENGINE & TURBOCHARGER, LTD., Sagamihara (JP)

(72) Inventors: Yoshitomo Noda, Tokyo (JP); Motoki Ebisu, Tokyo (JP); Hiroshi Suzuki, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 10 days.

(21) Appl. No.: 15/780,131

(22) PCT Filed: Dec. 4, 2015

(86) PCT No.: PCT/JP2015/084142
§ 371 (c)(1),
(2) Date: May 30, 2018

(87) PCT Pub. No.: WO2017/094183
PCT Pub. Date: Jun. 8, 2017

(65) Prior Publication Data
US 2018/0363501 A1    Dec. 20, 2018

(51) Int. Cl.
*F01D 25/18*    (2006.01)
*F01D 25/12*    (2006.01)
(Continued)

(52) U.S. Cl.
CPC ............. *F01D 25/18* (2013.01); *F01D 25/12* (2013.01); *F01D 25/186* (2013.01); *F01D 25/20* (2013.01);
(Continued)

(58) Field of Classification Search
CPC ........ F01D 25/12; F01D 25/18; F01D 25/186; F01D 25/20; F02C 6/12; F05D 2220/40;
(Continued)

(56) References Cited

U.S. PATENT DOCUMENTS 3,740,170 A * 6/1973 Miller .................. F01D 25/125
417/407
5,253,985 A * 10/1993 Ruetz .................... F01D 25/164
384/473
(Continued)

FOREIGN PATENT DOCUMENTS

DE      199 59 485 A1    6/2001
DE   102011088013 A1 *  6/2013
(Continued)

OTHER PUBLICATIONS

International Search Report and Written Opinion of the International Searching Authority (Forms PCT/ISA/210 and PCT/ISA/237) for Application No. PCT/JP2015/084142, dated Feb. 2, 2016, with an English translation.

*Primary Examiner* — J. Todd Newton
*Assistant Examiner* — Christopher R Legendre
(74) *Attorney, Agent, or Firm* — Birch, Stewart, Kolasch & Birch, LLP

(57) ABSTRACT

A turbocharger includes: a rotating shaft which extends along an axis; a turbine wheel which is provided on one end side of the rotating shaft; a compressor wheel which is provided on the other end side of the rotating shaft; a rolling bearing which includes an inner race fixed to an outer circumferential surface of the rotating shaft, an outer race surrounding the inner race from an outside in a radial (Continued)

direction, and rolling bodies arranged between the inner race and the outer race and rotatably supports the rotating shaft around the axis; a housing which covers the rolling bearing from an outer circumferential side with a gap between the housing and an outer circumferential surface of the rolling bearing; and a plurality of lubricating oil supply lines through which lubricating oil is supplied to different locations in the housing at different state quantities.

7 Claims, 15 Drawing Sheets

(51) Int. Cl.
*F16C 33/66* (2006.01)
*F16C 37/00* (2006.01)
*F01D 25/20* (2006.01)
*F02B 39/14* (2006.01)
*F16C 27/04* (2006.01)
*F02B 39/00* (2006.01)
*F16N 7/32* (2006.01)
*F16C 19/18* (2006.01)

(52) U.S. Cl.
CPC ............. *F02B 39/00* (2013.01); *F02B 39/14* (2013.01); *F16C 27/045* (2013.01); *F16C 33/667* (2013.01); *F16C 33/6674* (2013.01); *F16C 37/007* (2013.01); *F16N 7/32* (2013.01); *F05D 2220/40* (2013.01); *F16C 19/184* (2013.01); *F16C 2240/06* (2013.01); *F16C 2360/24* (2013.01)

(58) Field of Classification Search
CPC .. F16C 33/667; F16C 33/6674; F16C 37/007; F16C 2360/24
See application file for complete search history.

(56) References Cited

U.S. PATENT DOCUMENTS

| | | | |
|---|---|---|---|
| 6,439,836 B1* | 8/2002 | Pozivil | F01D 15/005 415/110 |
| 2012/0045326 A1* | 2/2012 | House | F01D 25/16 415/229 |
| 2014/0060042 A1* | 3/2014 | Aoki | F02D 41/1446 60/602 |
| 2014/0075916 A1 | 3/2014 | Augros | |
| 2018/0363501 A1* | 12/2018 | Noda | F01D 25/186 |

FOREIGN PATENT DOCUMENTS

| | | |
|---|---|---|
| DE | 10 2013 224 593 A1 | 7/2015 |
| EP | 2500544 A1 | 9/2012 |
| FR | 2 970 504 A1 | 7/2012 |
| JP | 58-15721 A | 1/1983 |
| JP | 62-78420 A | 4/1987 |
| JP | 1-113136 U | 7/1989 |
| JP | 2-20731 U | 2/1990 |
| JP | 4-350327 A | 12/1992 |
| JP | 2002-332864 A | 11/2002 |
| JP | 2009-243365 A | 10/2009 |
| JP | 5218822 B2 * | 6/2013 |
| JP | 2013-217436 A | 10/2013 |
| WO | WO 2011/058627 A1 | 5/2011 |

* cited by examiner

TURBOCHARGER AND ENGINE SYSTEM

TECHNICAL FIELD

The present invention relates to a turbocharger and an engine system.

BACKGROUND ART

Some turbochargers have a constitution in which a rotating shaft is supported by a rolling bearing. Such turbochargers each include a housing which includes a tubular accommodation part for accommodating a rolling bearing. A rolling bearing is supported by a housing by fitting an outer race of the rolling bearing into an accommodation part of the housing. A rotating shaft of a turbocharger is fitted into a rotatable inner race. Thus, a rotating shaft can rotate relative to a housing.

In such turbochargers, in order to minimize friction resistance in the rolling bearing, lubricating oil is supplied to a rolling bearing. If an amount of lubricating oil to be supplied is too small, a temperature of a rolling bearing increases when a turbocharger is in operation. However, if the amount of lubricating oil to be supplied is too much, an agitation loss of lubricating oil in a rolling bearing increases.

Patent Document 1 describes a constitution in which oil supply holes for supplying lubricating oil are provided in a rolling bearing of a turbocharger. The device of Patent Document 1 includes distribution flanges by which lubricating oil is distributed into a rolling bearing side and a turbine wheel side. With such a constitution, lubricating oil is prevented from being excessively supplied to a rolling bearing and stirring resistance of lubricating oil in a rolling bearing is minimized.

CITATION LIST

Patent Literature

Patent Document 1: Japanese Unexamined Patent Application, First Publication No. 2013-217436

SUMMARY OF INVENTION

Technical Problem

It is desirable that noise or vibration during rotation of the rotating shaft be further minimized in the above-described turbocharger. For this reason, a constitution in which an oil film damper is formed by interposing lubricating oil or the like in a minute gap between an inner circumferential surface of an accommodation part in a housing and an outer circumferential surface of an outer race in the rolling bearing is provided. In the oil film damper, a damping effect (vibration attenuating effect) due to a smoothing damping phenomenon of an oil film is obtained when vibration occurs on a rotating shaft.

An oil ring which seals between the housing and the rotating shaft is further provided on a turbine wheel side. The oil ring needs to be cooled using lubricating oil because a temperature thereof increases due to friction when the turbocharger is in operation.

Loss of lubricating oil supplied to the rolling bearing can be reduced by minimizing the amount of lubricating oil to be supplied as much as possible. On the other hand, if the amount of lubricating oil supplied to the oil film damper or the oil ring as described above is minimized, a damping effect or a cooling effect is reduced.

Patent Document 1 describes a constitution in which lubricating oil is only distributed into the bearing side and the turbine wheel side by the distribution flange. Thus, it is difficult to supply lubricating oil to the rolling bearing, the oil film damper, and the oil ring with different conditions in appropriate amounts.

An object of the present invention is to provide a turbocharger and an engine system which are capable of supplying lubricating oil to each part in appropriate amounts without waste.

Solution to Problem

According to a first aspect of the present invention, a turbocharger includes: a rotating shaft which extends along an axis; a turbine wheel which is provided on a first end side of the rotating shaft; a compressor wheel which is provided on a second end side of the rotating shaft. The turbocharger further includes: a rolling bearing which includes an inner race fixed to an outer circumferential surface of the rotating shaft, an outer race arranged to surround the inner race from an outside in a radial direction, and rolling bodies arranged between the inner race and the outer race and rotatably supports the rotating shaft around the axis. The turbocharger further includes: a housing which is arranged to cover the rolling bearing from an outer circumferential side with a gap between the housing and an outer circumferential surface of the rolling bearing; and a plurality of lubricating oil supply lines through which lubricating oil is supplied to different locations in the housing at different state quantities.

With such a constitution, the lubricating oil can be supplied to the different locations in the housing through the plurality of lubricating oil supply lines at the different state quantities. As a result, the lubricating oil can be supplied to each part in the housing in appropriate amounts without waste.

According to a second aspect of the present invention, in the turbocharger, the lubricating oil may be supplied to the different locations in the housing through the plurality of lubricating oil supply lines in the first aspect at different flow rates as the state quantities.

With such a constitution, the lubricating oil can be set to have the different flow rates through the plurality of lubricating oil supply lines. For this reason, the lubricating oil can be supplied to the different locations in the housing in appropriate amounts.

For example, the flow rate of lubricating oil supplied to a side near a compressor wheel which is at a relatively lower temperature can be reduced as compared with that of lubricating oil supplied to a side near a turbine wheel.

According to a third aspect of the present invention, in the turbocharger, the lubricating oil may be supplied to the different locations in the housing through the plurality of lubricating oil supply lines in the first or second aspect at different temperatures as the state quantities.

With such a constitution, the lubricating oil can be set to have the different temperatures through the plurality of lubricating oil supply lines. For this reason, a cooling performance of the lubricating oil can be improved without increasing the flow rate of the lubricating oil at a location at which cooling with lubricating oil is required.

According to a fourth aspect of the present invention, in the turbocharger, the plurality of lubricating oil supply lines in the first or second aspect may include: compressor side lubricating oil supply lines through which the lubricating oil is supplied to a side in the housing near the compressor wheel; and turbine side lubricating oil supply lines through which the lubricating oil is supplied to a side in the housing near the turbine wheel. The state quantity of the lubricating oil supplied through the compressor side lubricating oil supply lines may be different from the state quantity of the lubricating oil supplied through the turbine side lubricating oil supply lines.

In the turbocharger, the side near the turbine wheel is likely to have a high temperature and a temperature gradient occurs between the side near the compressor wheel and the side near the turbine wheel in some cases. If the temperature gradient occurs in this way, the side near the compressor wheel and the side near the turbine wheel have different degrees of thermal deformation and are likely to have vibration, noise, or the like occurring therein, which leads to bearing damage in some cases. However, when the state quantity of the lubricating oil supplied through the compressor side lubricating oil supply lines is set to be different from the state quantity of the lubricating oil supplied through the turbine side lubricating oil supply lines, for example, a cooling performance on the side near the turbine wheel can be set to be higher than a cooling performance on the side near the compressor wheel. As a result, a temperature gradient can be prevented from occurring between the side near the turbine wheel and the side near the compressor wheel and occurrence of vibration, noise, or the like can be prevented.

According to a fifth aspect of the present invention, in the turbocharger, in the fourth aspect, each of the turbine side lubricating oil supply lines may include a cooling device configured to cool the lubricating oil. The lubricating oil in the turbine side lubricating oil supply lines may be supplied at a lower temperature than the lubricating oil in the compressor side lubricating oil supply lines.

With such a constitution, a temperature gradient can be prevented from occurring between the side near the turbine wheel and the side near the compressor wheel in the housing without changing a flow rate of the lubricating oil in the turbine side lubricating oil supply lines.

According to a sixth aspect of the present invention, in the turbocharger, the plurality of lubricating oil supply lines in any one of the first to fifth aspects may include: first lubricating oil supply lines; second lubricating oil supply lines; and a third lubricating oil supply line. The lubricating oil is supplied to a space between the outer race and the inner race of the rolling bearing through the first lubricating oil supply lines. The lubricating oil is supplied to the gap through the second lubricating oil supply lines. The lubricating oil is supplied to an oil ring provided between an opening formed in the housing and the rotating shaft through the third lubricating oil supply line.

With such a constitution, the lubricating oil can be individually supplied to each of the space between the outer race and the inner race of the rolling bearing, the gap between the housing and the outer circumferential surface of the rolling bearing, and the oil ring between the opening formed in the housing and the rotating shaft through the first lubricating oil supply lines, the second lubricating oil supply lines, and the third lubricating oil supply line.

According to a seventh aspect of the present invention, in any one of the first to sixth aspects, the turbocharger may include: an operation state detecting unit which is configured to detect an operation state of the turbocharger; and lubricating oil adjustment parts which are individually configured to adjust state quantities of the lubricating oil supplied through the plurality of lubricating oil supply lines in accordance with the operation state.

With such a constitution, state quantities of the lubricating oil supplied to each part can be individually adjusted in accordance with, for example, an operation state of the turbocharger such as a temperature of each part, and the rotational speed of the engine including the turbocharger.

According to an eighth aspect of the present invention, in the seventh aspect, the turbocharger may include a control unit which is configured to control the lubricating oil adjustment parts on the basis of the operation state detected by the operation state detecting unit.

With such a constitution, the control unit can control the lubricating oil adjustment parts on the basis of the operation state detected by the operation state detecting unit. For this reason, the lubricating oil adjustment parts can be more finely adjusted.

According to a ninth aspect of the present invention, in the turbocharger, in the eighth aspect, the operation state detecting unit may detect the temperature of the housing as an operation state.

With such a constitution, the flow rate of the lubricating oil to be supplied can be changed in accordance with the temperature of the housing. As a result, the flow rate of the lubricating oil is minimized so that the lubricating oil can be supplied in appropriate amounts in accordance with an operation state and thus loss of the lubricating oil can be reduced.

According to a tenth aspect of the present invention, in the turbocharger, in the ninth aspect, the control unit may increase a flow rate of the lubricating oil when the temperature of the housing increases.

With such a constitution, if the number of revolutions of the turbocharger increases, the temperature of the housing also increases. If the temperature of the housing in the turbocharger increases, a larger amount of lubricating oil is required in each part of the turbocharger. Therefore, each part in the turbocharger can be appropriately lubricated by supplying a larger amount of lubricating oil in accordance with an increase in the temperature of the housing.

According to an eleventh aspect of the present invention, an engine system includes: the turbocharger according to any one of the eighth to tenth aspects; and an engine which is supercharged by the turbocharger, wherein the operation state detecting unit is configured to detect an operation state of the engine, and the control unit is configured to adjust a flow rate of the lubricating oil in accordance with the operation state of the engine.

With such a constitution, since an operation state of the turbocharger also changes in conjunction with an operation state of the engine, the lubricating oil can be supplied in appropriate amounts in accordance with the operation state by changing the flow rate of the lubricating oil supplied to the turbocharger in accordance with the operation state of the engine.

According to a twelfth aspect of the present invention, in the engine system, in the eleventh aspect, the operation state detecting unit may detect the number of revolutions of the engine.

With such a constitution, if the number of revolutions of the turbocharger increases, the temperature of the housing also increases. If the temperature of the housing in the turbocharger increases, a larger amount of lubricating oil is required in each part of the turbocharger. Therefore, each part in the turbocharger can be appropriately lubricated by detecting the number of revolutions of the engine to adjust the flow rate of the lubricating oil.

Advantageous Effects of Invention

According to the turbocharger and the engine system described above, lubricating oil can be supplied to each part in appropriate amounts.

DESCRIPTION OF EMBODIMENTS

First Embodiment

Figure 1:
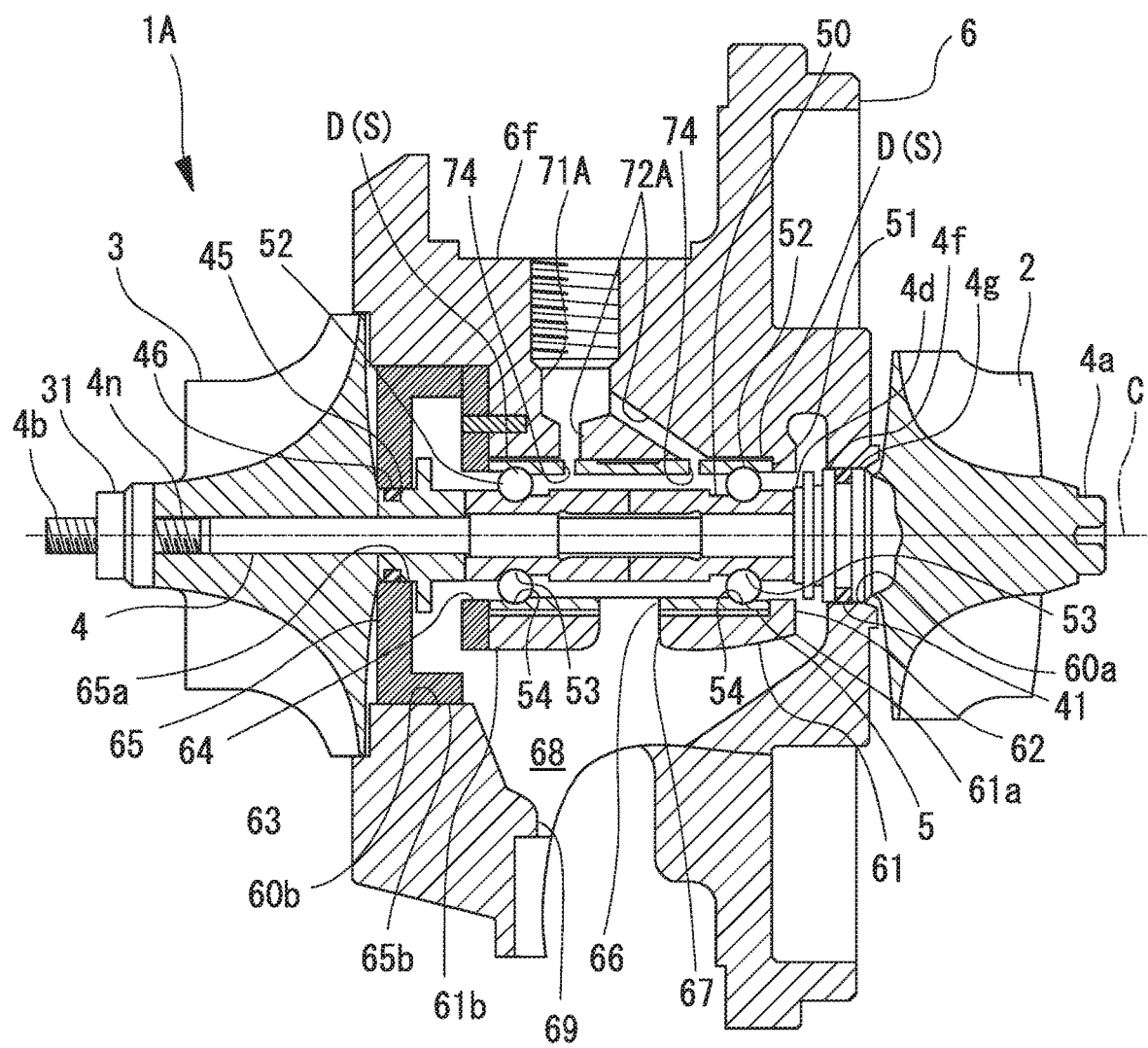
FIG. 1 is a cross-sectional view showing the constitution of a turbocharger according to a first embodiment of the present invention.
Figure 2:
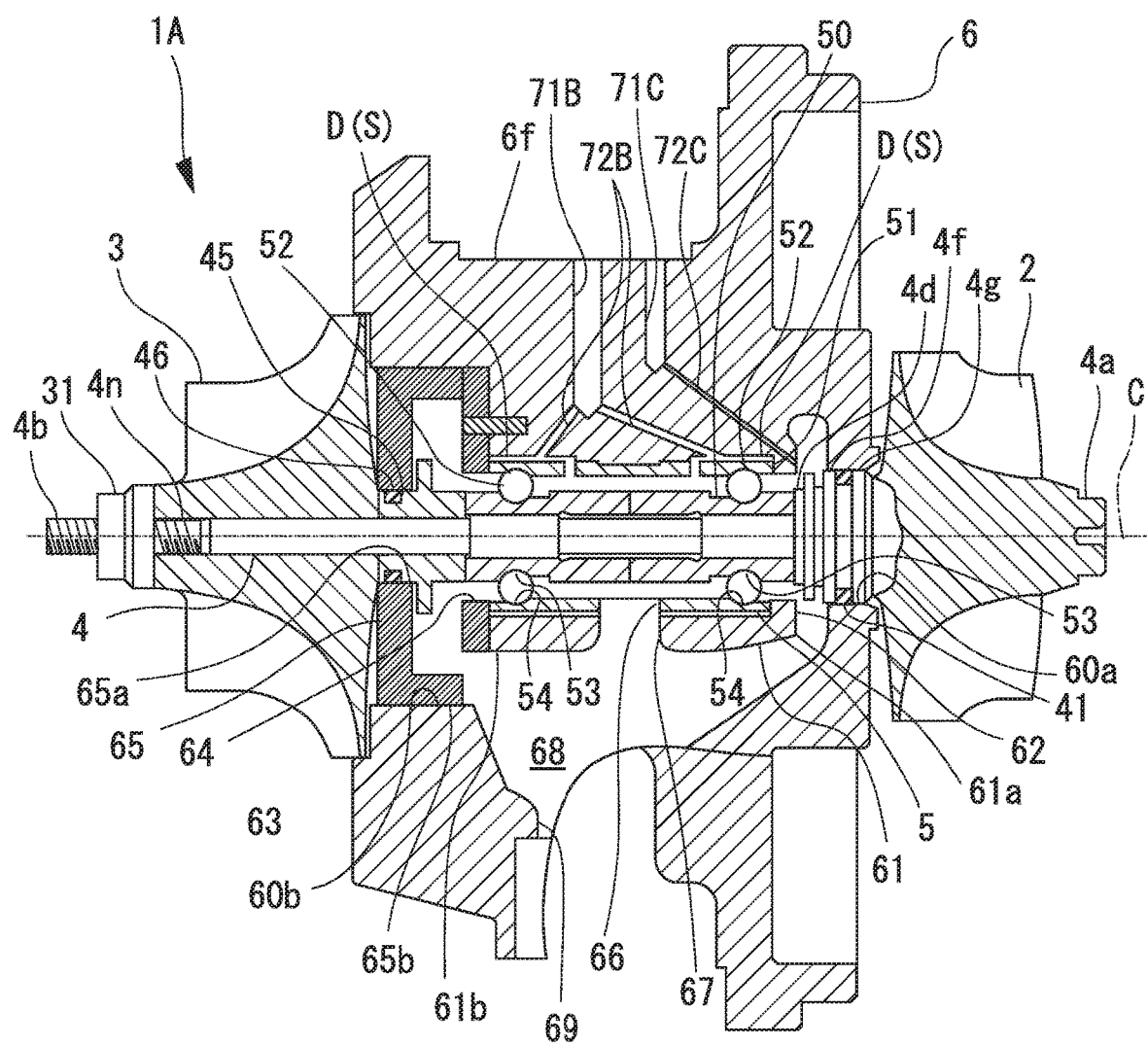
FIG. 2 is a cross-sectional view of the turbocharger according to the first embodiment of the present invention viewed from a different position from that in FIG. 1 in a circumferential direction.

FIG. 1 is a cross-sectional view showing a constitution of a turbocharger according to a first embodiment of the present invention. FIG. 2 is a cross-sectional view of the turbocharger according to the first embodiment of the present invention viewed from a different position from that in FIG. 1 in a circumferential direction.

As shown in FIG. 1, a turbocharger 1A includes a turbine wheel 2, a compressor wheel 3, a rotating shaft 4, a rolling bearing 5, and a housing 6. The turbocharger 1A is mounted, for example, in a vehicle or the like as an auxiliary device of an engine in a posture in which the rotating shaft 4 extends in a horizontal direction.

An alternate long and short dash line shown in FIG. 1 indicates a central axis (axis) C of the rotating shaft 4.

In the following description, a side at which the turbocharger 1A faces upward in a state in which the turbocharger 1A is mounted in a vehicle or the like is referred to as an "upper side" and a side at which the turbocharger 1A faces downward is referred to as a "lower side."

In the turbocharger 1A, the turbine wheel 2 rotates about the central axis C due to an exhaust gas flow supplied from the engine (not shown). The rotating shaft 4 and the compressor wheel 3 rotate about the central axis C along with the rotation of the turbine wheel 2. The compressor wheel 3 compresses air using the rotating compressor wheel 3. The compressed air is supplied to the engine (not shown).

The housing 6 is supported by a vehicle body or the like via a bracket (not shown), a compressor, a turbine, or the like. The housing 6 includes an accommodation part 61 which accommodates the rolling bearing 5 therein. The housing 6 includes an opening 60a on one end side thereof and an opening 60b on the other end side thereof. The rotating shaft 4 is rotatably supported around the central axis C by the rolling bearing 5 accommodated in the accommodation part 61. A first end 4a and a second end 4b of the rotating shaft 4 protrude outside of the housing 6 through the openings 60a and 60b.

The turbine wheel 2 is provided on one end side of the housing 6 and the compressor wheel 3 is provided on the other end side of the housing 6. The turbine wheel 2 is integrally formed with the first end 4a of the rotating shaft 4. The compressor wheel 3 is coupled to the second end 4b of the rotating shaft 4 by screwing a nut 31 to a threaded portion 4n formed on the second end 4b of the rotating shaft 4. The rotating shaft 4, the turbine wheel 2, and the compressor wheel 3 rotate around the central axis C together with the rotating shaft 4.

The rolling bearing 5 includes an inner race 50, an outer race 51, and rolling bodies 52.

The inner race 50 is formed in a cylindrical shape. An outer circumferential surface of the rotating shaft 4 is fixed to the inner race 50 by fitting or the like and the inner race 50 rotates together with the rotating shaft 4.

The outer race 51 is formed in a cylindrical shape with a larger diameter than the inner race 50. The outer race 51 is arranged on an outer circumferential side of the inner race 50 and is arranged to surround the inner race 50 from the outside in a radial direction. In addition, the outer race 51 is arranged spaced apart radially from the inner race 50.

The rolling bodies 52 are formed in a spherical shape. The plurality of rolling bodies 52 are provided between the inner race 50 and the outer race 51. The plurality of rolling bodies 52 are provided at intervals in a circumferential direction using cages (not shown). Raceway grooves 53 continuous in the circumferential direction are formed in both ends of an outer circumferential surface of the inner race 50 in an axial direction in which the central axis C extends. Similarly, raceway grooves 54 continuous in the circumferential direction are formed in both ends of an inner circumferential surface of the outer race 51 in the central axis C direction to face each other on outer circumferential sides of the raceway grooves 53. The plurality of rolling bodies 52 are sandwiched between the raceway grooves 53 and 54 on both ends of the rolling bearing 5 in the axial direction in which the central axis C extends. Thus, when the inner race 50 rotates with respect to the outer race 51 together with the rotating shaft 4, the plurality of rolling bodies 52 roll between the inner race 50 and the outer race 51.

The accommodation part 61 formed inside the housing 6 is formed in a cross-sectional circular shape when viewed from the axial direction in which the central axis C extends. The accommodation part 61 is formed to be continuous in the axial direction in which the central axis C extends. The rolling bearing 5 is accommodated in the accommodation part 61. To be more specific, the outer race 51 of the rolling bearing 5 is arranged inside the accommodation part 61. An inner diameter of the accommodation part 61 is formed slightly larger than an outer diameter of the outer race 51 in the rolling bearing 5. Thus, a gap S is formed between the outer race 51 of the rolling bearing 5 and the accommodation part 61.

As shown in FIG. 1, a thrust receiving part 62 is formed in an end 61a of the accommodation part 61 near the turbine wheel 2. The thrust receiving part 62 receives a thrust load of the rolling bearing 5 toward the turbine wheel 2. The thrust receiving part 62 protrudes inward from the end 61a of the accommodation part 61 in the radial direction. The outer race 51 of the rolling bearing 5 accommodated in the accommodation part 61 abuts the thrust receiving part 62.

A thrust receiving member 63 is attached to an end 61b of the accommodation part 61 near the compressor wheel 3. The thrust receiving member 63 receives a thrust load of the rolling bearing 5 toward the compressor wheel 3. The thrust receiving member 63 is formed in a disk shape with an opening 64 formed in a central portion thereof. The thrust receiving member 63 is provided in a state in which the thrust receiving member 63 abuts the end 61b of the accommodation part 61. The outer race 51 abuts a circumferential edge of the opening 64 of the thrust receiving member 63. Here, the thrust receiving part 62 and the thrust receiving member 63 may be provided or omitted if necessary.

A large diameter part 4d is provided on a portion of the rotating shaft 4 on the side of the inner race 50 of the rolling bearing 5 closer to the turbine wheel 2. The large diameter part 4d has an outer diameter larger than an inner diameter of the inner race 50. The inner race 50 is provided in a state in which an end of the inner race 50 near the turbine wheel 2 is caused to abut on the large diameter part 4d of the rotating shaft 4.

Flanges 4f and 4g which project from the large diameter part 4d to the outer circumferential side are formed on the rotating shaft 4 inside the opening 60a of the housing 6. The flanges 4f and 4g are formed at intervals in the axial direction of the rotating shaft 4.

An annular oil ring 41 continuous in the circumferential direction is provided between the flanges 4f and 4g of the rotating shaft 4. Sealing properties between the opening 60a and the rotating shaft 4 are maintained by the oil ring 41.

A cylindrical bush 45 is provided on a portion of the rotating shaft 4 on the side of the inner race 50 of the rolling bearing 5 closer to the compressor wheel 3. The bush 45 is provided to be sandwiched between the inner race 50 and the compressor wheel 3.

In this way, the inner race 50 of the rolling bearing 5 is provided to be sandwiched between the large diameter part 4d of the rotating shaft 4 and the bush 45.

A plate 65 which closes the opening 60b is provided in the opening 60b of the housing 6. The plate 65 is formed in a disk shape with an opening 65a formed in a central portion thereof. A circumferential wall 65b extending toward the thrust receiving member 63 side in the axial direction in which the central axis C extends is integrally formed with an outer circumferential portion of the plate 65. The plate 65 is provided in a state in which the bush 45 is inserted into the opening 65a and the circumferential wall 65b is caused to abut on the thrust receiving member 63.

An annular oil ring 46 is provided on an outer circumferential surface of the bush 45 inside the opening 65a. Sealing properties between the opening 65a and the rotating shaft 4 are maintained by the oil ring 46.

Also, the housing 6 includes an oil supply pipe connection port 71A which extends from an outer circumferential surface 6f inward in the radial direction of the housing 6. A lubricating oil supply pipe (not shown) for supplying lubricating oil from the outside of the housing 6 is connected to the oil supply pipe connection port 71A.

A plurality of supply flow paths (first lubricating oil supply lines or lubricating oil supply lines) 72A are formed between a distal end of the oil supply pipe connection port 71A and the accommodation part 61. The supply flow paths 72A open immediately inside rolling bodies 52 provided on both ends of a rolling bearing 5 in the axial direction in which a central axis C extends.

The outer race 51 of the rolling bearing 5 accommodated in the accommodation part 61 includes lubricating oil introduction holes 74. The lubricating oil introduction holes 74 are each formed at positions at which the lubricating oil introduction holes 74 face the supply flow paths 72A opening in an inner surface of the accommodation part 61 and are formed to pass through the outer race 51 in the radial direction.

When lubricating oil is fed from a lubricating oil supply pipe (not shown) connected to the oil supply pipe connection port 71A, the lubricating oil passes through two supply flow paths 72A from the distal end of the oil supply pipe connection port 71A and is fed into the accommodation part 61. The lubricating oil fed into the accommodation part 61 further passes through the lubricating oil introduction hole 74 and is fed into the outer race 51. Thus, the lubricating oil is supplied between the inner race 50 of the rolling bearing 5 and the outer race 51 and the rolling bodies 52 are lubricated.

As shown in FIG. 2, the housing 6 further includes oil supply pipe connection ports 71B and 71C. The oil supply pipe connection ports 71B and 71C extend from the outer circumferential surface 6f of the housing 6 inward in the radial direction of the housing 6. The oil supply pipe connection ports 71B and 71C are formed at different positions from the oil supply pipe connection port 71A in a circumferential direction or an axial direction of the housing 6. A lubricating oil supply pipe (not shown) for supplying lubricating oil from the outside is connected to the oil supply pipe connection ports 71B and 71C.

The housing 6 includes a plurality of supply flow paths (second lubricating oil supply lines or lubricating oil supply lines) 72B between a distal end of the oil supply pipe connection port 71B and the accommodation part 61. The supply flow paths 72B open toward the gap S between the accommodation part 61 and the outer race 51.

When lubricating oil is fed from a lubricating oil supply pipe (not shown) connected to each of the oil supply pipe connection ports 71B, the lubricating oil passes through two supply flow paths 72B from distal ends of the oil supply pipe connection ports 71B and is fed into the gap S between the accommodation part 61 and the outer race 51. Thus, an oil film damper D for minimizing noise or vibration when the rotating shaft 4 rotates is formed in the gap S between the accommodation part 61 and the outer race 51. The oil film damper D exhibits a vibration damping effect due to a smoothing damping phenomenon of an oil film when vibration is generated by the rotating shaft 4.

A supply flow path (third lubricating oil supply line or lubricating oil supply line) 72C is formed between a distal end of the oil supply pipe connection port 71C and the large diameter part 4d of the rotating shaft 4. The supply flow path 72C is formed to extend from the distal end of the oil supply pipe connection port 71C toward the large diameter part 4d. The supply flow path 72C in the embodiment opens at a position at which the supply flow path 72C faces the large diameter part 4d.

When lubricating oil is fed from a lubricating oil supply pipe (not shown) connected to the oil supply pipe connection port 71C, the lubricating oil passes through the supply flow path 72C from the distal end of the oil supply pipe connection port 71C and is discharged from its opening. The discharged lubricating oil is supplied to the vicinity of the oil ring 41 provided on an end of the rotating shaft 4 near the turbine wheel 2. Thus, the lubricating oil takes the heat of the rotating shaft 4 near the oil ring 41 and thus an increase in temperature of the oil ring 41 caused by friction generated when the rotating shaft 4 rotates is minimized.

Here, in the supply flow path 72A for supplying lubricating oil to the rolling bodies 52 of the rolling bearing 5, the supply flow path 72B for supplying lubricating oil to the oil film damper D, and the supply flow path 72C for supplying lubricating oil to the oil ring 41, amounts of supply that are state quantities of lubricating oil (that is, flow rates) differ. In order to achieve this, for example, cross-sectional areas of the supply flow path 72A, the supply flow path 72B, and the supply flow path 72C are set to be different. In this way, appropriate amounts of lubricating oil can be supplied to the rolling bodies 52 of the rolling bearing 5, the oil film damper D, and the oil ring 41.

The lowermost ends of the outer race 51 of the rolling bearing 5 and the accommodation part 61 have discharge flow paths 66 and 67 which are formed to pass through the outer race 51 and the accommodation part 61 downward. The housing 6 includes an oil discharge chamber 68 below the accommodation part 61. The discharge flow paths 66 and 67 open above the oil discharge chamber 68.

The housing 6 includes an oil discharge port 69 which passes through a lower end of the oil discharge chamber 68 and the outer circumferential surface 6f of the housing 6 at the lowermost portion thereof.

Lubricating oil fed between the outer race 51 of the rolling bearing 5 and the inner race 50 passes through both ends of the outer race 51 and the inner race 50, the discharge flow path 66 formed in the outer race 51, and the discharge flow path 67 formed in the accommodation part 61 in the axial direction in which the central axis C extends and is discharged to the oil discharge chamber 68.

Lubricating oil fed into the gap S between the accommodation part 61 and the outer race 51 flows from a circumferential edge of the discharge flow path 66 to the discharge flow path 67 and is discharged to the oil discharge chamber 68.

Lubricating oil supplied to the oil ring 41 flows downward as it is and is discharged to the oil discharge chamber 68.

Lubricating oil in the oil discharge chamber 68 is discharged to the outside of the housing 6 through the oil discharge port 69.

According to the above-described first embodiment, lubricating oil is individually supplied to each of the rolling bodies 52 of the rolling bearing 5, the oil film damper D, and the oil ring 41 through the supply flow paths 72A, 72B, and 72C. Thus, appropriate amounts of lubricating oil can be supplied to each of the rolling bodies 52 of the rolling bearing 5, the oil film damper D, and the oil ring 41. Therefore, the rolling bearing 5 can be lubricated sufficiently to an extent that stirring resistance is not excessively large and a damping effect in the oil film damper D and a cooling effect of the oil ring 41 can be significantly exerted. As a result, lubricating oil can be supplied appropriately to each part of the turbocharger 1A.

In addition, when an appropriate lubricating oil is supplied to each part, a total flow rate of lubricating oil supplied to the turbocharger 1A can be reduced. For this reason, loss caused due to energy consumed by a pump or the like required for supplying lubricating oil can be reduced.

First Modified Example of First Embodiment

Figure 3:
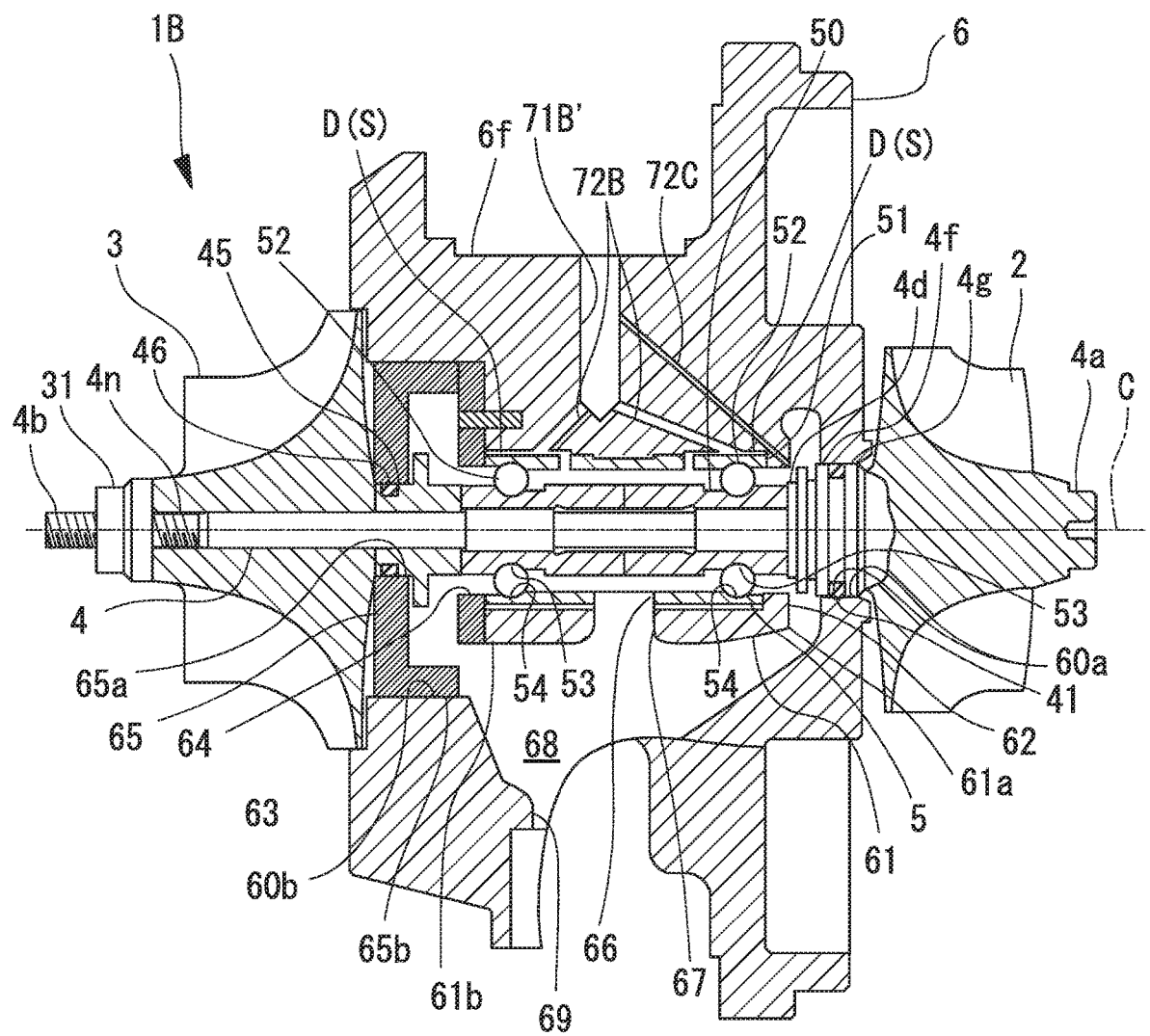
FIG. 3 is a cross-sectional view showing the constitution of a turbocharger according to a first modified example of the first embodiment of the present invention.

FIG. 3 is a cross-sectional view showing a constitution of a turbocharger according to a first modified example of the first embodiment of the present invention.

Although a case in which the supply flow path 72A, the supply flow path 72B, and the supply flow path 72C are formed to pass through the oil supply pipe connection ports 71A, 71B, and 71C is exemplified in the first embodiment, the present invention is not limited thereto.

As shown in FIG. 3, in the first modified example of the first embodiment, a housing 6 of a turbocharger 1B includes an oil supply pipe connection port 71B'. The oil supply pipe connection port 71B' is formed at a different position from an oil supply pipe connection port 71A in a circumferential direction.

The housing 6 further includes supply flow paths 72B, 72B, and 72C. Lubricating oil is supplied from the oil supply pipe connection port 71B' to an oil film damper D and an oil ring 41 through the supply flow paths 72B, 72B, and 72C.

With such a constitution, like in the first embodiment, appropriate amounts of lubricating oil can be supplied to rolling bodies 52 of a rolling bearing 5, the oil film damper D, and the oil ring 41. Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1B.

Second Modified Example of First Embodiment

Figure 4:
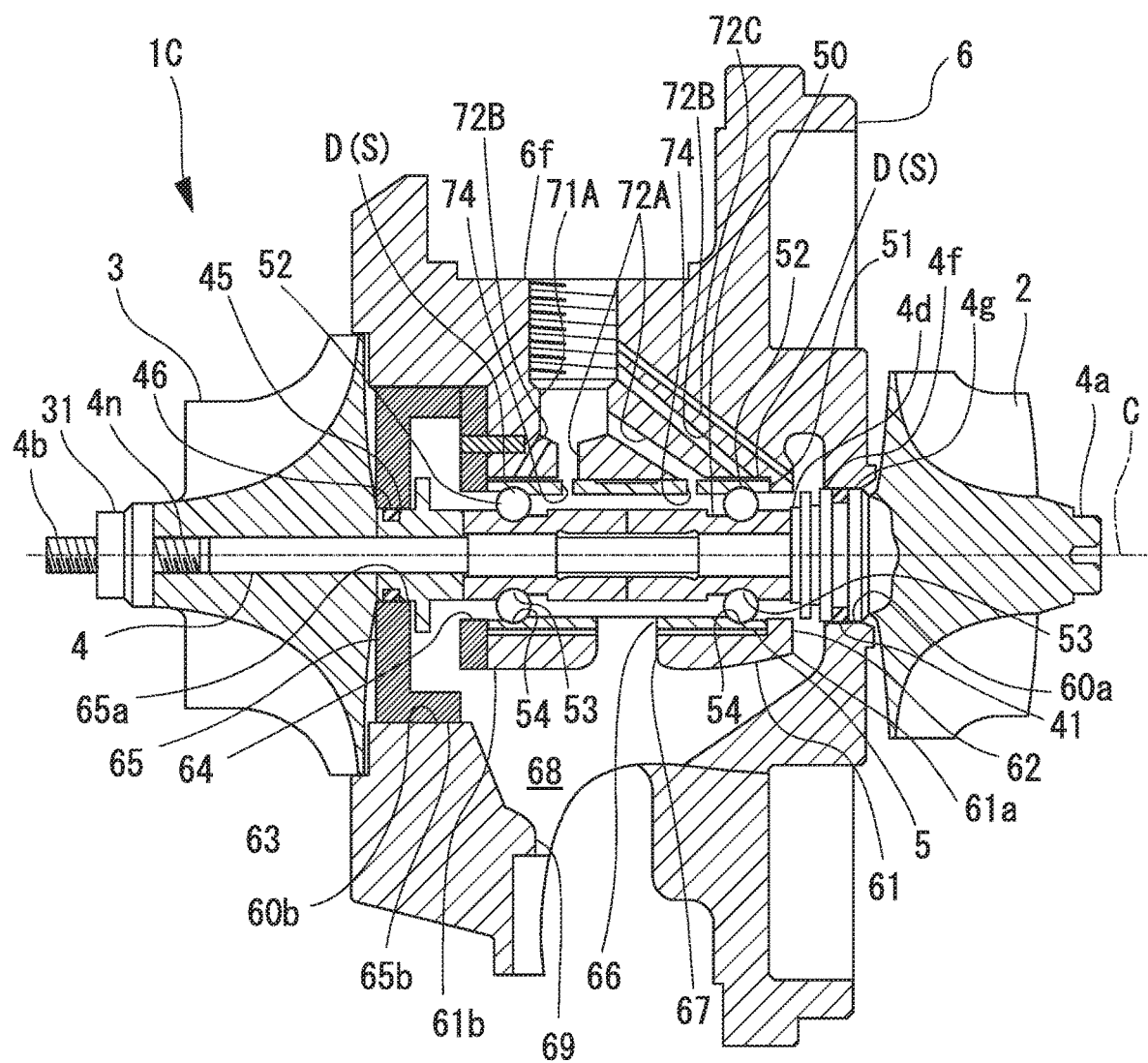
FIG. 4 is a cross-sectional view showing the constitution of a turbocharger according to a second modified example of the first embodiment of the present invention.

FIG. 4 is a cross-sectional view showing a constitution of a turbocharger according to a second modified example of the first embodiment of the present invention.

As shown in FIG. 4, a housing 6 of a turbocharger 1C in the second modified example includes two supply flow paths 72A, two supply flow paths 72B, and one supply flow path 72C. The supply flow paths 72A, 72B, and 72C extend from one oil supply pipe connection port 71A toward rolling bodies 52 of a rolling bearing 5, an oil film damper D, and an oil ring 41.

With such a constitution, one oil supply pipe connection port 71A may be formed in the housing 6.

Also with such a constitution, like in the above-described first embodiment, appropriate amounts of lubricating oil can be supplied to the rolling bodies 52 of the rolling bearing 5, the oil film damper D, and the oil ring 41. Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1C.

Second Embodiment

A second embodiment of the present invention will be described below. A turbocharger according to the second embodiment and the turbocharger according to the first embodiment differ only in that lubricating oil supply systems are separate on a compressor wheel side and a turbine wheel side in the turbocharger according to the second embodiment. Therefore, in the second embodiment, constituent elements that are the same as those of the first embodiment will be denoted with the same reference numerals and an overlapping description thereof will be omitted. In other words, description of the overall constitution of the turbocharger that is the same as the constitution which has been described in the first embodiment will be omitted.

Figure 5:
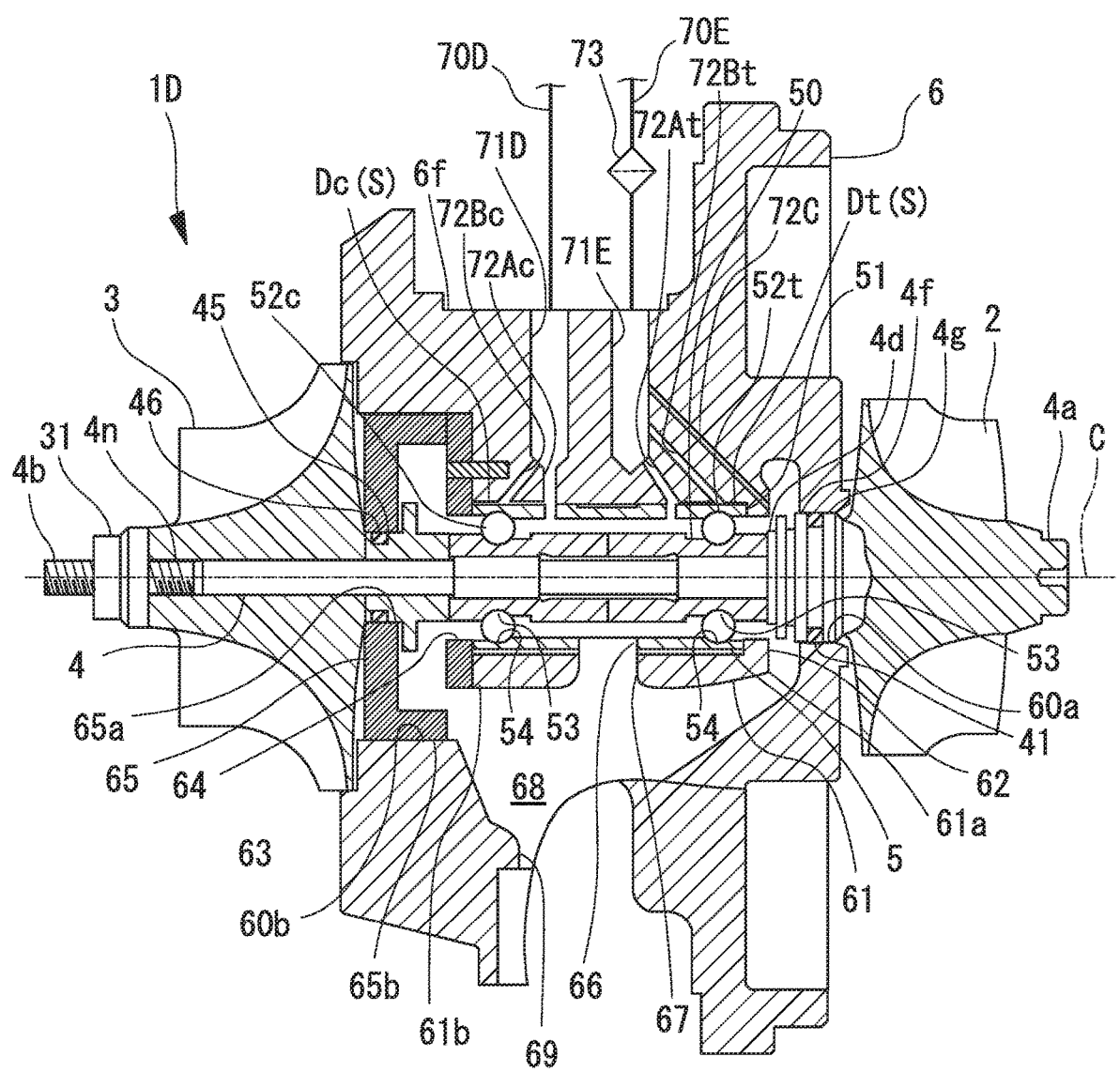
FIG. 5 is a cross-sectional view showing the constitution of a turbocharger according to a second embodiment of the present invention.

FIG. 5 is a cross-sectional view showing a constitution of the turbocharger according to the second embodiment of the present invention.

As shown in FIG. 5, a housing 6 in a turbocharger 1D includes oil supply pipe connection ports 71D and 71E. The oil supply pipe connection ports 71D and 71E extend from an outer circumferential surface 6f inward in a radial direction of the housing 6. The oil supply pipe connection ports 71D and 71E are formed at the same position in the circumferential direction of the housing 6 and are formed at intervals in an axial direction in which a central axis C of the housing 6 extends. Lubricating oil supply pipes 70D and 70E for supplying lubricating oil from the outside of the housing 6 are connected to the oil supply pipe connection ports 71D and 71E.

The housing 6 further includes a supply flow path (first lubricating oil supply lines or lubricating oil supply line) 72Ac and a supply flow path (second lubricating oil supply lines or lubricating oil supply line) 72Bc.

The supply flow path 72Ac communicates with the oil supply pipe connection port 71D and supplies lubricating oil to rolling bodies 52c of the rolling bearing 5 near the compressor wheel 3. The supply flow path 72Bc communicates with the oil supply pipe connection port 71D and supplies lubricating oil to the oil film damper Dc near the compressor wheel 3.

The housing 6 further includes a supply flow path (first lubricating oil supply lines or lubricating oil supply line) 72At, a supply flow path (second lubricating oil supply lines or lubricating oil supply line) 72Bt, and a supply flow path 72C. The supply flow path 72At communicates with the oil supply pipe connection port 71E and supplies lubricating oil to rolling bodies 52t of the rolling bearing 5 near the turbine wheel 2. The supply flow path 72Bt communicates with the oil supply pipe connection port 71E and supplies lubricating oil to the oil film damper Dt near the turbine wheel 2. The supply flow path 72C communicates with the oil supply pipe connection port 71E and supplies lubricating oil to the oil ring 41 near the turbine wheel 2.

An oil cooler (cooling device) 73 for cooling lubricating oil is provided in the lubricating oil supply pipe 70E for supplying lubricating oil to the oil supply pipe connection port 71E.

Lubricating oil supplied from the oil supply pipe connection port 71D through the supply flow paths 72Ac and 72Bc (compressor side lubricating oil supply lines) is fed to the rolling bodies 52c of the rolling bearing 5 and the oil film damper Dc near the compressor wheel 3.

Lubricating oil supplied from the oil supply pipe connection port 71E through the supply flow paths 72At, 72Bt, and 72C (turbine side lubricating oil supply lines) is fed to the rolling bearing 5, the oil film damper Dt, and the oil ring 41 near the turbine wheel 2. Lubricating oil cooled by an oil cooler 73 is fed to the rolling bearing 5, the oil film damper Dt, and the oil ring 41 near the turbine wheel 2.

According to the second embodiment, like in the first embodiment, lubricating oil can be individually supplied to the rolling bodies 52 of the rolling bearing 5, the oil film damper D, and the oil ring 41. Thus, appropriate amounts of lubricating oil can be supplied to the rolling bodies 52 of the rolling bearing 5, the oil film damper D, and the oil ring 41.

In addition, lubricating oil supply systems are separate for the rolling bodies 52c of the rolling bearing 5 and the oil film damper Dc near the compressor wheel 3 and the rolling bearing 5, the oil film damper Dt, and the oil ring 41 near the turbine wheel 2. Lubricating oil cooled by the oil cooler 73 is fed to the rolling bearing 5, the oil film damper Dt, and the oil ring 41 near the turbine wheel 2 which are higher in temperature than the compressor wheel 3 side. For this reason, the rolling bearing 5, the oil film damper Dt, and the oil ring 41 near the turbine wheel 2 can be effectively cooled.

Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1D.

Modified Example of Second Embodiment

Although the oil cooler 73 for cooling lubricating oil is provided in the lubricating oil supply pipe 70E for supplying lubricating oil to the oil supply pipe connection port 71E in the second embodiment, the present invention is not limited thereto.

For example, a pipe length of the lubricating oil supply pipe 70E for supplying lubricating oil to the oil supply pipe connection port 71E may be longer than that of the lubricating oil supply pipe 70D for supplying lubricating oil to the oil supply pipe connection port 71D.

Lubricating oil passing through the lubricating oil supply pipes 70D and 70E is cooled when the lubricating oil supply pipes 70D and 70E come into contact with the surrounding air. Thus, the temperature of lubricating oil passing through the lubricating oil supply pipe 70E with a long pipe length is lower than a temperature of lubricating oil passing through the lubricating oil supply pipe 70D. Therefore, lubricating oil at a lower temperature is fed to the rolling bearing 5, the oil film damper Dt, and the oil ring 41 near the turbine wheel 2 which are higher in temperature than the compressor wheel 3 side. As a result, the rolling bearing 5, the oil film damper Dt, and the oil ring 41 can be effectively cooled.

Third Embodiment

A third embodiment of the present invention will be described below. A turbocharger according to the third embodiment and the turbochargers according to the first and second embodiments differ only in that rolling bodies 52c of a rolling bearing 5 and an oil film damper Dc near a compressor wheel 3 and a rolling bearing 5, an oil film damper Dt, and an oil ring 41 near a turbine wheel 2 include separate lubricating oil supply systems. Therefore, in the description of the third embodiment, constituent elements that are the same as those of the first and second embodiments will be denoted with the same reference numerals and an overlapping description thereof will be omitted. In other words, differences between the third embodiment and the first and second embodiments will be mainly described and a description of a constitution that is the same as the constitutions which have been described in the first and second embodiments will be omitted.

Figure 6:
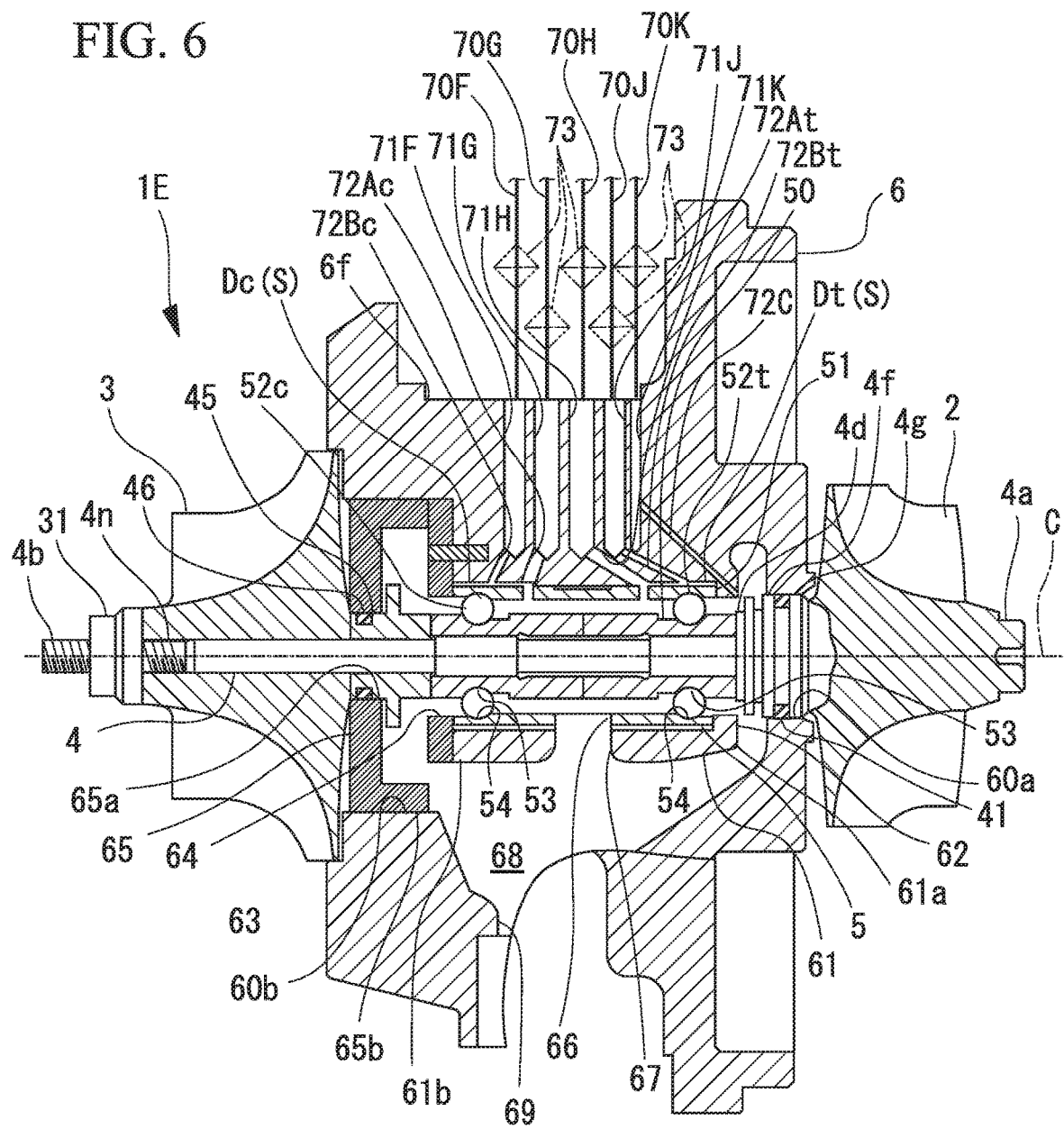
FIG. 6 is a cross-sectional view showing the constitution of a turbocharger according to a third embodiment of the present invention.

FIG. 6 is a cross-sectional view showing a constitution of the turbocharger according to the third embodiment of the present invention.

As shown in FIG. 6, a housing 6 of a turbocharger 1E includes oil supply pipe connection ports 71F, 71G, 71H, 71J, and 71K. The oil supply pipe connection ports 71F, 71G, 71H, 71J, and 71K extend from an outer circumferential surface 6f of the housing 6 inward in a radial direction of the housing 6. The oil supply pipe connection ports 71F, 71G, 71H, 71J, and 71K are formed at the same position in a circumferential direction of the housing 6 and are formed at intervals in an axial direction in which a central axis C of the housing 6 extends. Lubricating oil supply pipe 70F, 70G, 70H, 70J, and 70K for supplying lubricating oil from the outside of the housing 6 are connected to the oil supply pipe connection ports 71F, 71G, 71H, 71J, and 71K.

The housing 6 further includes a supply flow path 72Bc, a supply flow path 72Ac, a supply flow path 72At, a supply flow path 72Bt, and a supply flow path 72C. The supply flow path 72Bc, the supply flow path 72Ac, the supply flow path 72At, the supply flow path 72Bt, and the supply flow path 72C have different inner diameters.

The supply flow path 72Bc communicates with the oil supply pipe connection port 71F and supplies lubricating oil to the oil film damper Dc near the compressor wheel 3.

The supply flow path 72Ac communicates with the oil supply pipe connection port 71G and supplies lubricating oil to the rolling bodies 52c of the rolling bearing 5 near the compressor wheel 3.

The supply flow path 72At communicates with the oil supply pipe connection port 71H and supplies lubricating oil to the rolling bodies 52t of the rolling bearing 5 near the turbine wheel 2.

The supply flow path 72Bt communicates with the oil supply pipe connection port 71J and supplies lubricating oil to the oil film damper Dt near the turbine wheel 2.

The supply flow path 72C communicates with the oil supply pipe connection port 71K and supplies lubricating oil to the oil ring 41 near the turbine wheel 2.

According to the turbocharger 1E in the third embodiment, lubricating oil can be individually supplied to each of the rolling bodies 52c of the rolling bearing 5 and the oil film damper Dc near the compressor wheel 3 and the rolling bodies 52t of the rolling bearing 5, the oil film damper Dt, and the oil ring 41 near the turbine wheel 2. In addition, since the inner diameters of the supply flow path 72Bc, the supply flow path 72Ac, the supply flow path 72At, the supply flow path 72Bt, and the supply flow path 72C are different from each other, appropriate amounts of lubricating oil can be supplied to the rolling bodies 52 of the rolling bearing 5, the oil film damper D, and the oil ring 41.

Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1E.

Modified Example of Third Embodiment

In the above-described third embodiment, a case in which a flow rate of lubricating oil is adjusted when the inner diameters of the supply flow path 72Bc, the supply flow path 72Ac, the supply flow path 72At, the supply flow path 72Bt, and the supply flow path 72C are set to be different from each other has been described. However, the present invention is not limited thereto. For example, the cooling device (indicated by broken lines in FIG. 6) such as oil coolers 73 with different cooling performances may be provided in the lubricating oil supply pipes 70F, 70Q 70H, 70J, and 70K.

Thus, temperatures that are state quantities of lubricating oils supplied through the supply flow path 72Bc, the supply flow path 72Ac, the supply flow path 72At, the supply flow path 72Bt, and the supply flow path 72C can be set to be different from each other. For this reason, an increase in flow rate of lubricating oil can be minimized at a location at which cooling with lubricating oil is required.

In the modified example of the above-described third embodiment, a case in which the cooling device are provided in all of the lubricating oil supply pipes 70F, 70G, 70H, 70J, and 70K has been exemplified. However, the above-described cooling device may be provided, for example, only in the lubricating oil supply pipes 70H, 70J, and 70K for supplying lubricating oil to the oil supply pipe connection ports 71H, 71J, and 71K near the turbine wheel 2.

Fourth Embodiment

A fourth embodiment of the present invention will be described below. A turbocharger according to the fourth embodiment and the turbocharger according to the first embodiment differ in that a flow rate of lubricating oil supplied to each part is adjusted in accordance with a temperature of the turbocharger. Therefore, in the description of the fourth embodiment, constituent elements that are the same as those of the first embodiments will be denoted with the same reference numerals and an overlapping description thereof will be omitted. In other words, differences between the third embodiment and the first and second embodiments will be mainly described and a description of a constitution that is the same as the constitutions which have been described in the first and second embodiments will be omitted.

Figure 7:
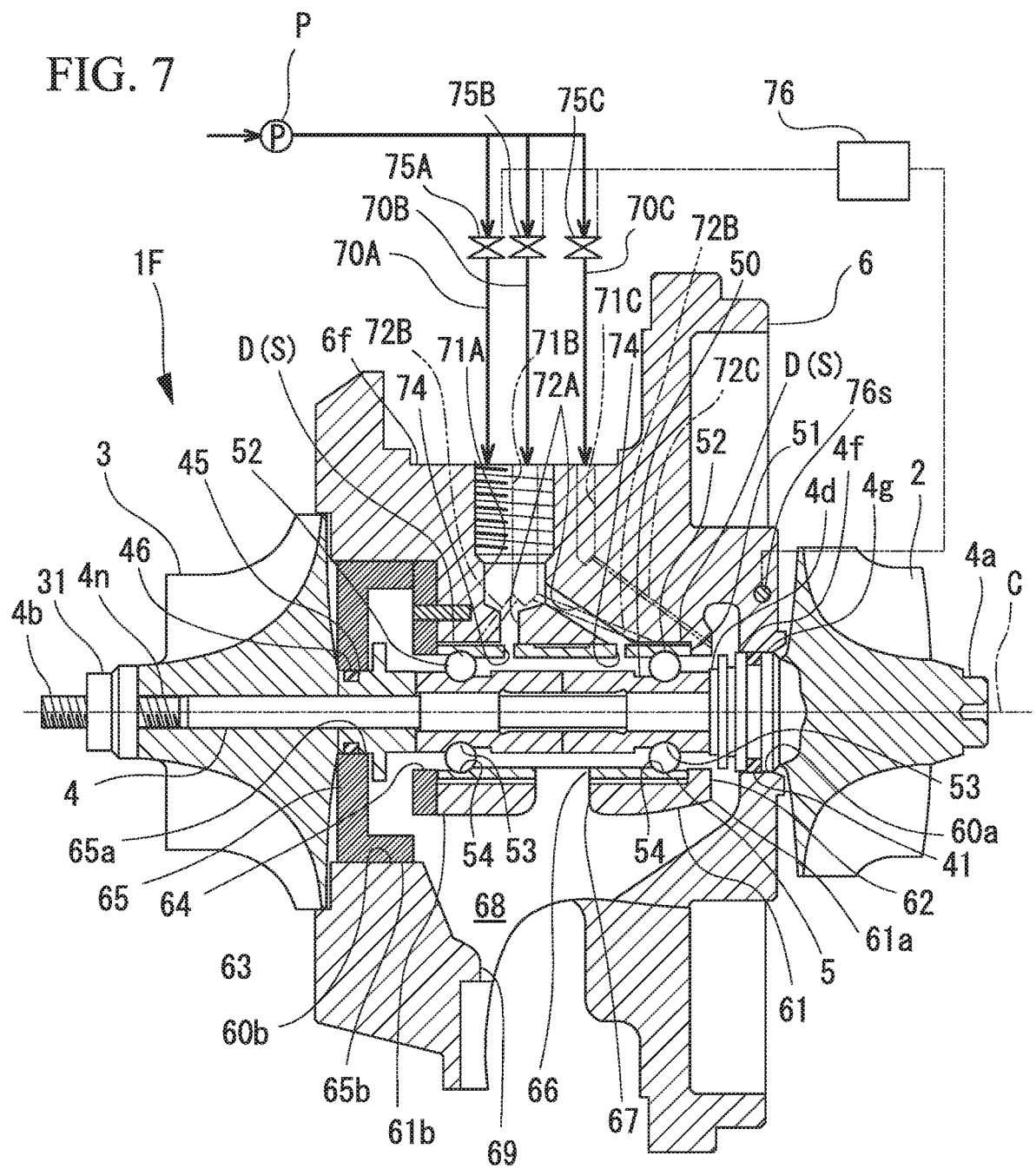
FIG. 7 is a cross-sectional view showing the constitution of a turbocharger according to a fourth embodiment of the present invention.

FIG. 7 is a cross-sectional view showing a constitution of the turbocharger according to the fourth embodiment of the present invention.

As shown in FIG. 7, a housing 6 of a turbocharger 1F in the fourth embodiment includes oil supply pipe connection ports 71A, 71B, and 71C. The oil supply pipe connection ports 71A, 71B, and 71C extend from an outer circumferential surface 6f of the housing 6 inward in a radial direction of the housing 6. The oil supply pipe connection ports 71B and 71C are formed at different positions from the oil supply pipe connection port 71A in a circumferential direction and an axial direction of the housing 6.

A plurality of supply flow paths 72A are formed between a distal end of the oil supply pipe connection port 71A and an accommodation part 61. The supply flow paths 72A open immediately inside rolling bodies 52 provided on both ends of a rolling bearing 5 in the axial direction in which a central axis C extends.

A plurality of supply flow paths 72B are formed between a distal end of the oil supply pipe connection port 71B and the accommodation part 61. The supply flow path 72B opens toward a gap S between the accommodation part 61 and an outer race 51.

A supply flow path 72C is formed between a distal end of the oil supply pipe connection port 71C and a large diameter part 4d of the rotating shaft 4.

A lubricating oil supply pipe 70A is connected to the oil supply pipe connection port 71A. A lubricating oil supply pipe 70B is connected to the oil supply pipe connection ports 71B. A lubricating oil supply pipe 70C is connected to the oil supply pipe connection port 71C. Lubricating oil fed from the outside by a pump P is individually supplied to each of the oil supply pipe connection ports 71A, 71B, and 71C through the lubricating oil supply pipes 70A, 70B, and 70C. The lubricating oil supply pipes 70A, 70B, and 70C include automatic adjustment valves (lubricating oil adjustment parts) 75A, 75B, and 75C. The automatic adjustment valves 75A, 75B, and 75C automatically adjust a degree of opening so that the degree of opening is a preset degree of opening in accordance with a temperature of the housing 6 measured by an operation state detecting unit 76.

Here, the operation state detecting unit 76 detects an operation state of the turbocharger 1F by measuring the temperature of the housing 6. The operation state detecting unit 76 includes a sensor 76s for measuring the temperature of the housing 6. The sensor 76s is installed, for example, near a turbine wheel 2 which is at a particularly high temperature in the housing 6. The sensor 76s may be located near the turbine wheel 2 as long as the position thereof is a position at which a temperature of the housing 6 can be detected. However, the sensor 76s provided near the turbine wheel 2 is advantageous in that a temperature at a location with a severe temperature condition can be directly monitored.

According to the turbocharger 1F in the fourth embodiment, lubricating oil is individually supplied to each of the rolling bodies 52 of the rolling bearing 5, the oil film damper D, and the oil ring 41 through the supply flow paths 72A, 72B, and 72C. A flow rate of the lubricating oil supplied through the supply flow paths 72A, 72B, and 72C is automatically adjusted by the automatic adjustment valves 75A, 75B, and 75C in accordance with the temperature of the housing 6. When the turbocharger 1F is in operation, an appropriate amount of lubricating oil can be supplied to each of the rolling bodies 52 of the rolling bearing 5, the oil film damper D, and the oil ring 41 in accordance with the temperature measurement results of the housing 6. Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1F.

Modified Example of Fourth Embodiment

A constitution in which the flow rate of lubricating oil supplied to each part is adjusted in accordance with a temperature of the housing 6 detected by the operation state detecting unit 76 like in the fourth embodiment can also be applied to turbochargers other than the turbocharger 1F shown in the above-described fourth embodiment. For example, the same constitution may be applied to the turbochargers 1A to 1E with the constitutions shown in the first, second, and third embodiments and the modified examples thereof.

Fifth Embodiment

A fifth embodiment of the present invention will be described below. A turbocharger according to the fifth embodiment and the turbocharger of the fourth embodiment differ only in that a degree of opening of a control valve for adjusting a flow rate of lubricating oil is automatically adjusted in accordance with an operation state of the turbocharger in the turbocharger according to the fifth embodiment. Therefore, in the description of the fifth embodiment, constituent elements that are the same as those of the fourth embodiment will be denoted with the same reference numerals and overlapping description thereof will be omitted. In other words, differences between the fifth embodiment and the first to fourth embodiments will be mainly described and description of a constitution that is the same as the constitutions which have been described in the first to fourth embodiments will be omitted.

Figure 8:
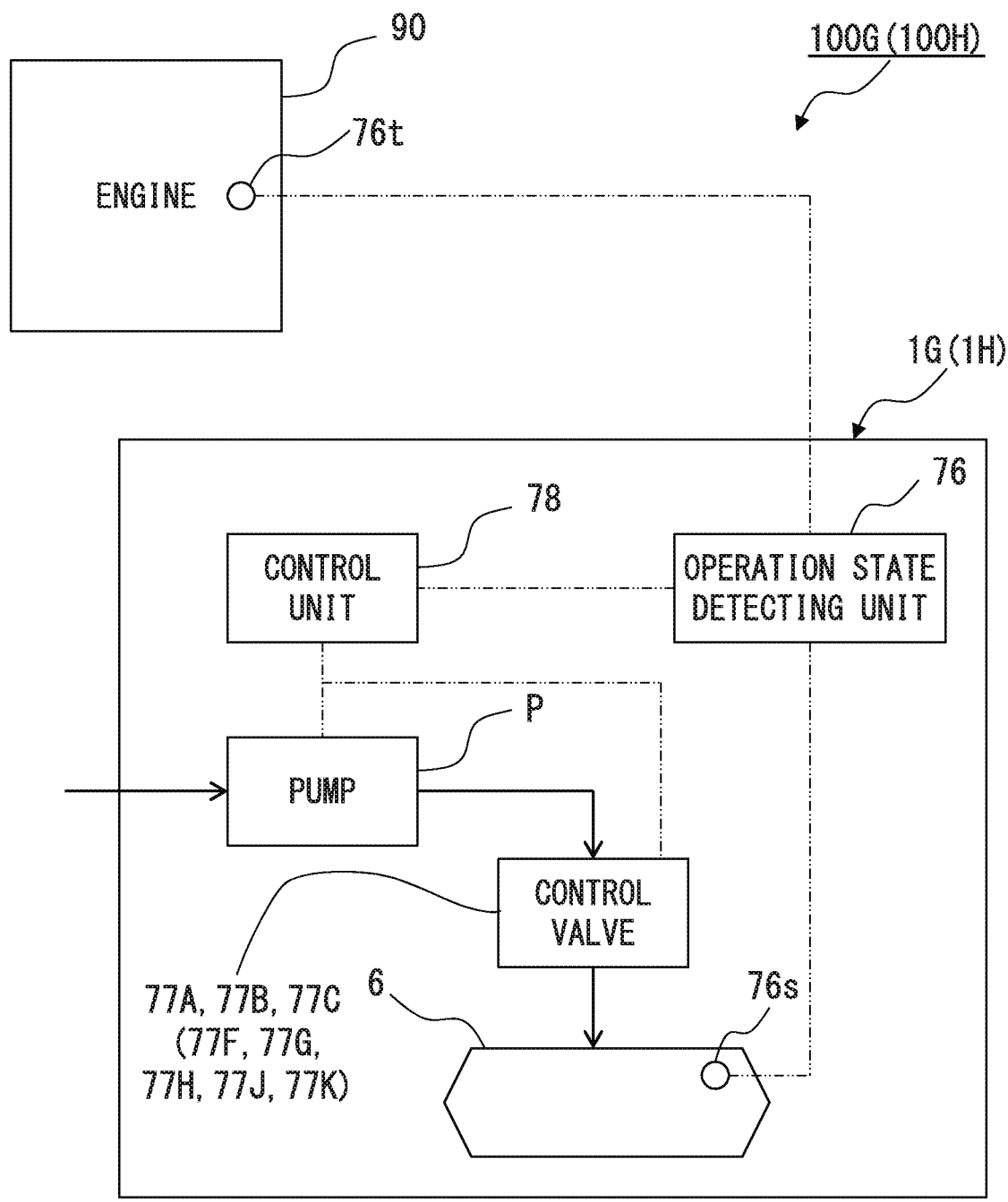
FIG. 8 is a diagram showing the schematic constitution of an engine system according to a fifth embodiment of the present invention.
Figure 9:
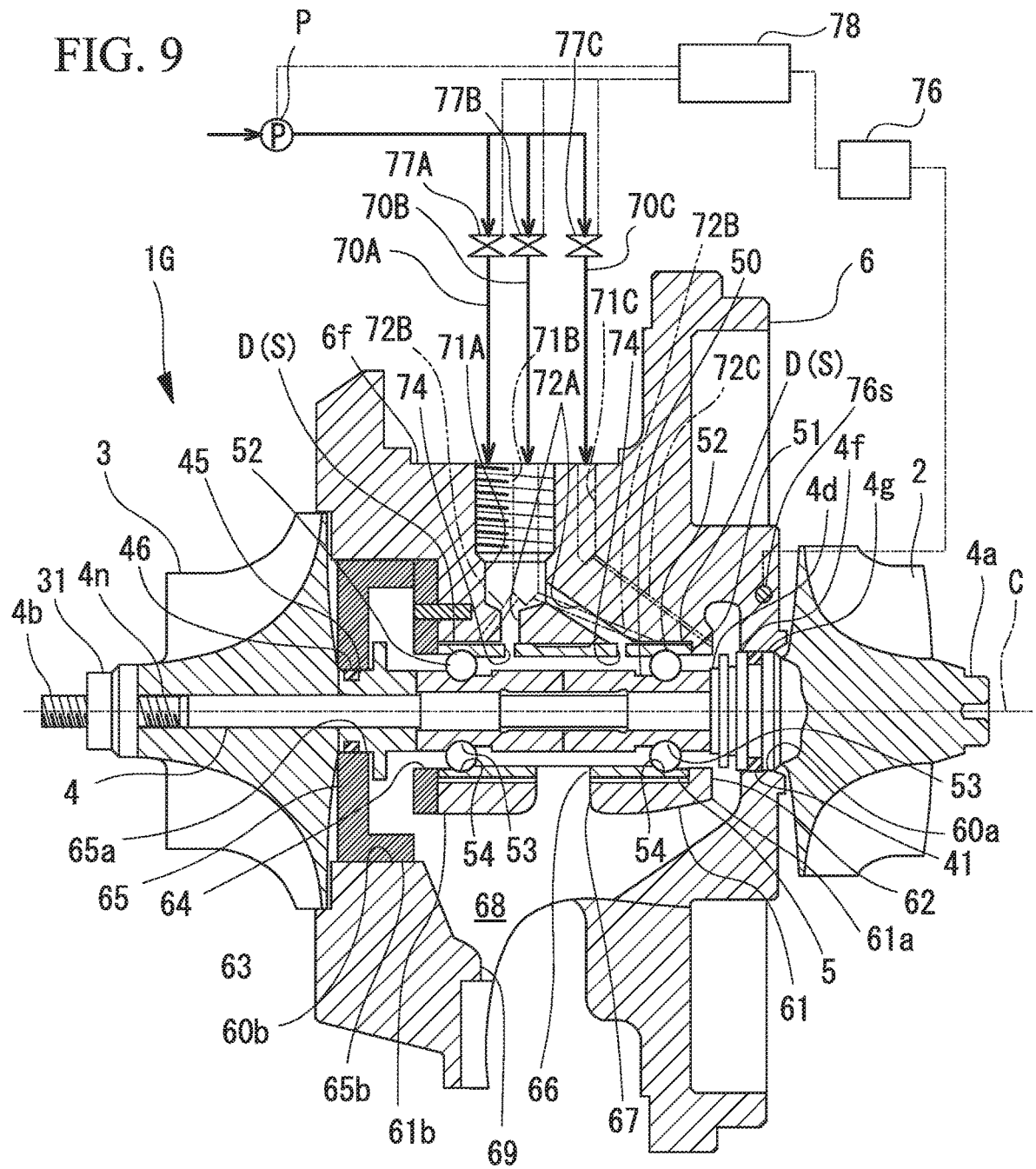
FIG. 9 is a cross-sectional view showing the constitution of a turbocharger according to the fifth embodiment of the present invention.

FIG. 8 is a diagram showing a schematic constitution of an engine system according to the fifth embodiment of the present invention. FIG. 9 is a cross-sectional view showing a constitution of a turbocharger according to the fifth embodiment of the present invention.

As shown in FIG. 8, an engine system 100G includes a turbocharger 1G and an engine 90 supercharged by the turbocharger 1G.

As shown in FIG. 9, a housing 6 in the turbocharger 1G includes oil supply pipe connection ports 71A, 71B, and 71C. The oil supply pipe connection ports 71A, 71B, and 71C extend from an outer circumferential surface 6f of the housing 6 inward in a radial direction of the housing 6. The oil supply pipe connection ports 71B and 71C are formed at different positions from the oil supply pipe connection port 71A in a circumferential direction and an axial direction of the housing 6.

A plurality of supply flow paths 72A are formed between a distal end of the oil supply pipe connection port 71A and an accommodation part 61. The supply flow paths 72A open immediately inside rolling bodies 52 provided on a rolling bearing 5 in the axial direction in which a central axis C extends.

A plurality of supply flow paths 72B are formed between a distal end of the oil supply pipe connection port 71B and the accommodation part 61. The supply flow path 72B opens toward a gap S between the accommodation part 61 and an outer race 51.

A supply flow path 72C is formed between a distal end of the oil supply pipe connection port 71C and a large diameter part 4d of a rotating shaft 4.

A lubricating oil supply pipe 70A is connected to the oil supply pipe connection port 71A. A lubricating oil supply pipe 70B is connected to the oil supply pipe connection ports 71B. A lubricating oil supply pipe 70C is connected to the oil supply pipe connection port 71C. Lubricating oil fed from the outside by a pump P is individually supplied to each of the oil supply pipe connection ports 71A, 71B, and 71C through the lubricating oil supply pipes 70A, 70B, and 70C.

The lubricating oil supply pipes 70A, 70B, and 70C include control valves (lubricating oil adjustment parts) 77A, 77B, and 77C, respectively. The control valves 77A, 77B, and 77C are configured such that degrees of opening thereof can be adjusted under control of a controller 78.

The controller 78 individually controls a degree of opening of the control valve 77A, 77B, or 77C in accordance with a temperature of the housing 6 measured by an operation state detecting unit 76.

The operation state detecting unit 76 detects an operation state of the turbocharger 1G by measuring a temperature of the housing 6. The operation state detecting unit 76 includes a sensor 76s for measuring a temperature of the housing 6 like in the fourth embodiment. The sensor 76s is installed, for example, near a turbine wheel 2 which is at a high temperature in the housing 6. The sensor 76s may not be located near the turbine wheel 2 as long as the position thereof is a position at which a temperature of the housing 6 can be detected like in the description of the fourth embodiment.

In addition, the controller 78 can control all flow rates of lubricating oil by controlling the number of revolutions of the pump P on the basis of a temperature of the housing 6 measured by the operation state detecting unit 76.

The controller 78 may be configured to control a degree of opening of the control valve 77A, 77B, or 77C or the number of revolutions of the pump P in accordance with the operation state of the turbocharger 1G on the basis of parameters other than a temperature of the housing 6 as parameters of the operation state of the turbocharger 1G For example, the controller 78 may control the number of revolutions of the pump P in accordance with an elapsed time since starting-up of the turbocharger 1G or the number of revolutions of the engine 90. The elapsed time since starting-up of the turbocharger 1G may be obtained from an elapsed time after the engine 90 of a vehicle or the like starts up.

When the number of revolutions of the pump P is controlled on the basis of an elapsed time after the engine 90 starts up or the number of revolutions of the engine 90 as described above, as shown in FIG. 8, the operation state detecting unit 76 can use a sensor 76t such as a control computer of the engine 90, a rotational speed sensor of the engine 90, and an opening sensor of an accelerator to detect an operation state of the turbocharger 1G The number of revolutions of the pump P can be obtained using a table, a map, a mathematical expression, or the like for a pre-stored operation state and the number of revolutions of the pump P.

A method for controlling the turbocharger 1G in the engine system 100G as described above will be described below.

Figure 10:
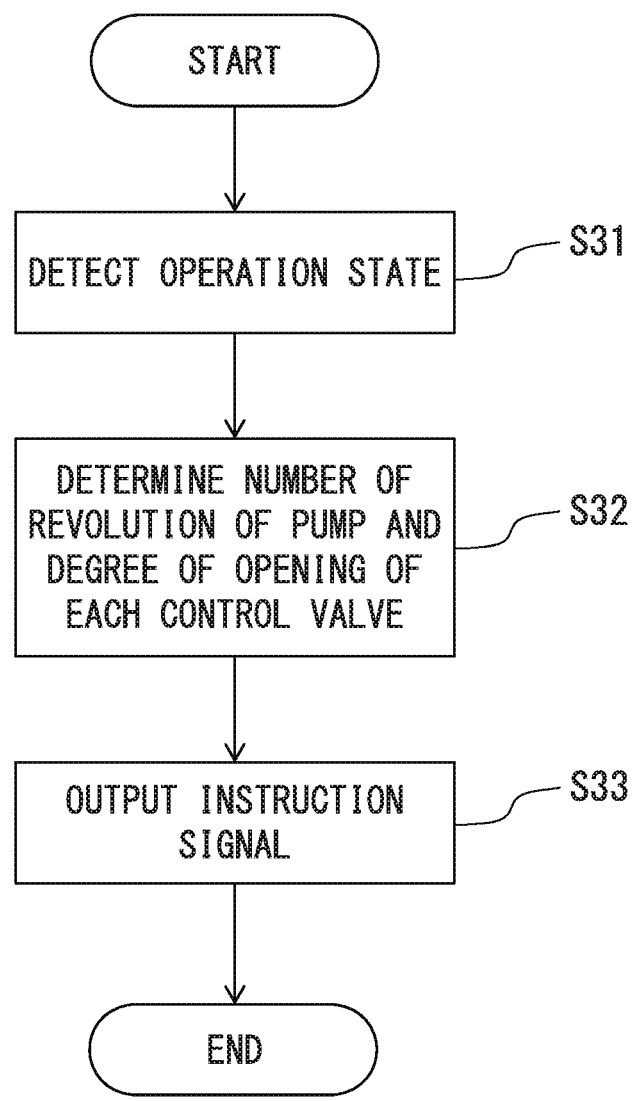
FIG. 10 is a diagram showing a flow of a method for controlling the turbocharger according to the fifth embodiment of the present invention.

FIG. 10 is a diagram showing a flow of a method for controlling the turbocharger according to the fifth embodiment of the present invention.

Step S31 of Detecting Operation State

As shown in FIG. 10, in order to control the turbocharger 1G, first, an operation state of the turbocharger 1G is detected (Step S31).

Thus, the operation state detecting unit 76 detects the temperature of the housing 6 and the number of revolutions of the engine 90 using the sensor 76s and the sensor 76t. The operation state detecting unit 76 outputs the temperature of the housing 6 and the number of revolutions of the engine 90 detected by the sensors 76s and 76t to the controller 78.

(Steps S32 and S33 of Adjusting Flow Rate of Lubricating Oil)

The controller 78 controls a flow rate of lubricating oil supplied to the housing 6 by changing a degree of opening of the control valve 77A, 77B, or 77C on the basis of the temperature of the housing 6 or the number of revolutions of the engine 90 output from the operation state detecting unit 76. The controller 78 can also adjust the flow rate of the lubricating oil supplied to the housing 6 by changing the number of revolutions of the pump P.

Figure 11:
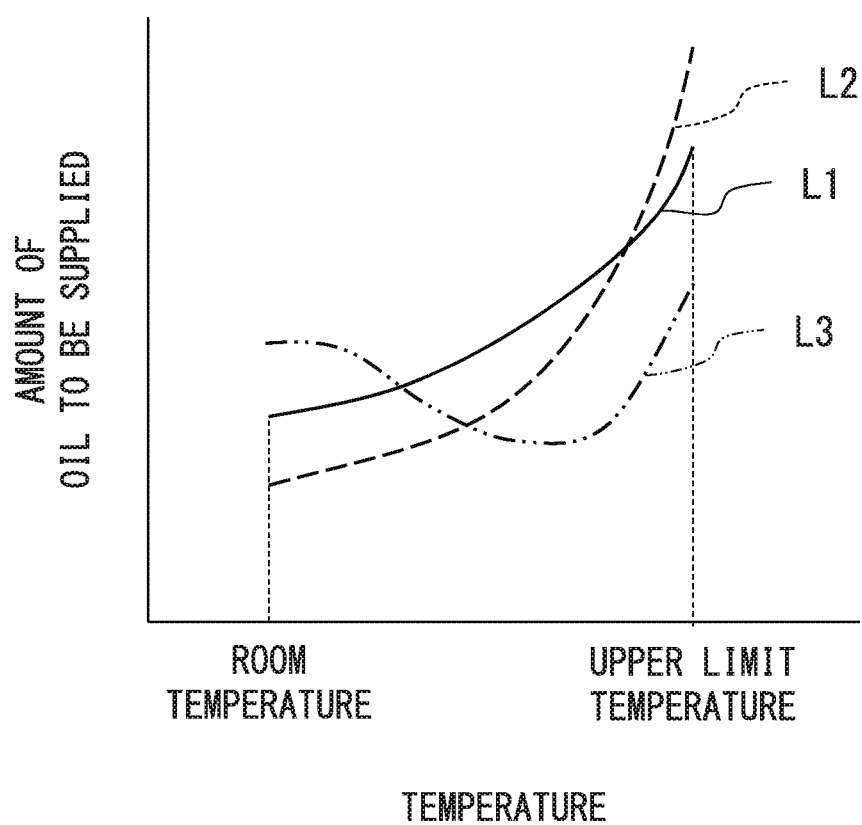
FIG. 11 is a diagram showing an example of a correlation between a temperature of a housing and amounts of oil supplied to a rolling bearing, an oil film damper, and an oil ring.

FIG. 11 is a diagram showing an example of a correlation between a temperature of a housing 41 and the amounts of oil supplied to the rolling bearing 5, the oil film damper Dc, and an oil ring.

As shown in FIG. 11, amounts of oil to be supplied to the rolling bearing 5, the oil film damper Dc, and the oil ring 41 differ in accordance with the temperature of the housing 6.

For example, as indicated by a solid line L1 in FIG. 11, more much lubricating oil is required for the rolling bearing 5 when the temperature of the housing 6 increases.

As indicated by a broken line L2 in FIG. 11, an amount of lubricating oil required for the oil ring 41 is low when a temperature of the housing 6 is low (when the number of revolutions of the turbocharger 1G is low), but more lubricating oil than that for the rolling bearing 5 is required when the temperature of the housing increases.

As indicated by an alternate long and two short dash line L3 in FIG. 11, more lubricating oil is required for the oil film damper Dc to increase a damping effect when a temperature of the housing 6 is low (when the number of revolutions of the turbocharger 1G is low) and the temperature thereof is high, but less lubricating oil can be used during normal rotation.

The controller 78 associates a temperature of the housing 6 with a degree of opening of the control valve 77A, 77B, or 77C on the basis of, for example, the correlation as described in FIG. 11 and performs setting using a table, a map, a mathematical expression, or the like.

Similarly, when the number of revolutions of the engine 90 increases, the number of revolutions of the turbocharger 1G also increases in conjunction with the number of revolutions of the engine 90 and a temperature of the housing 6 increases. Thus, the controller 78 may associate the amount of oil supply (or oil supply pressure), that is, the degree of opening of the control valve 77A, 77B, or 77C, with the number of revolutions of the engine 90 and perform setting using a table, a map, a mathematical expression, or the like.

The controller 78 determines the degree of opening of the control valve 77A, 77B, or 77C and the number of revolutions of the pump P which have previously associated with each other in relation to the temperature of the housing 6 output from the operation state detecting unit 76 or the number of revolutions of the engine 90 (Step S32).

The controller 78 outputs an instruction signal to the control valve 77A, 77B, or 77C and the pump P so that the degree of opening of the control valve 77A, 77B, or 77C and the number of revolutions of the pump P reach the determined degree of opening of the control valve 77A, 77B, or 77C and the determined number of revolutions of the pump P (Step S33).

In this way, a flow rate of lubricating oil supplied to the housing 6 is automatically adjusted on the basis of an operation state such as the temperature of the housing 6 or the number of revolutions of the engine 90.

Lubricating oil can be individually supplied to each of the rolling bodies 52 of the rolling bearing 5, the oil film damper D, and the oil ring 41 by adjusting a degree of opening of the control valve 77A, 77B, or 77C as described above. The controller 78 can increase a degree of opening of the control valve 77B so that sufficient lubricating oil is supplied to the oil film damper D, for example, when the housing 6 is at a low temperature immediately after the engine starts up and an elapsed time since starting-up of the engine is within a predetermined time. In addition, the controller 78 can increase a degree of opening of the control valve 77A or 77C so that sufficient lubricating oil is supplied to the rolling bodies 52 of the rolling bearing 5 and the oil ring 41 when the number of revolutions of the engine is high and the housing 6 is at a high temperature.

In this way, appropriate amounts of lubricating oil can be supplied to the rolling bodies 52 of the rolling bearing 5, the oil film damper D, and the oil ring 41.

In addition, a response can be improved further by adjusting a degree of opening of the control valve 77A, 77B, or 77C and thus adjusting the amount of supply than by adjustment of a flow rate of lubricating oil with the pump P.

According to the fifth embodiment, lubricating oil is individually supplied to each of the rolling bodies 52 of the rolling bearing 5, the oil film damper D, and the oil ring 41 through the supply flow paths 72A, 72B, and 72C. The flow rate of lubricating oil supplied through the supply flow paths 72A, 72B, and 72C is adjusted in accordance with an operation state of the turbocharger 1G by the control valves 77A, 77B, and 77C whose degrees of opening are automatically controlled. Appropriate amounts of lubricating oil can be supplied to the rolling bodies 52 of the rolling bearing 5, the oil film damper D, and the oil ring 41 in accordance with the operation state of the turbocharger 1G. Therefore, the rolling bearing 5 can be lubricated sufficiently to an extent that stirring resistance is not excessively large and a damping effect in the oil film damper D and a cooling effect of the oil ring 41 can be significantly exerted. As a result, a lubricating oil can be supplied appropriately to each part of the turbocharger 1G.

First Modified Example of Fifth Embodiment

A constitution in which the flow rate of lubricating oil supplied to each part is adjusted by adjusting a degree of opening of the control valve 77A, 77B, or 77C by a controller 78 in accordance with an operation state of the turbocharger 1G like in the fifth embodiment can also be applied to turbochargers other than the turbocharger 1G shown in the fifth embodiment.

Figure 12:
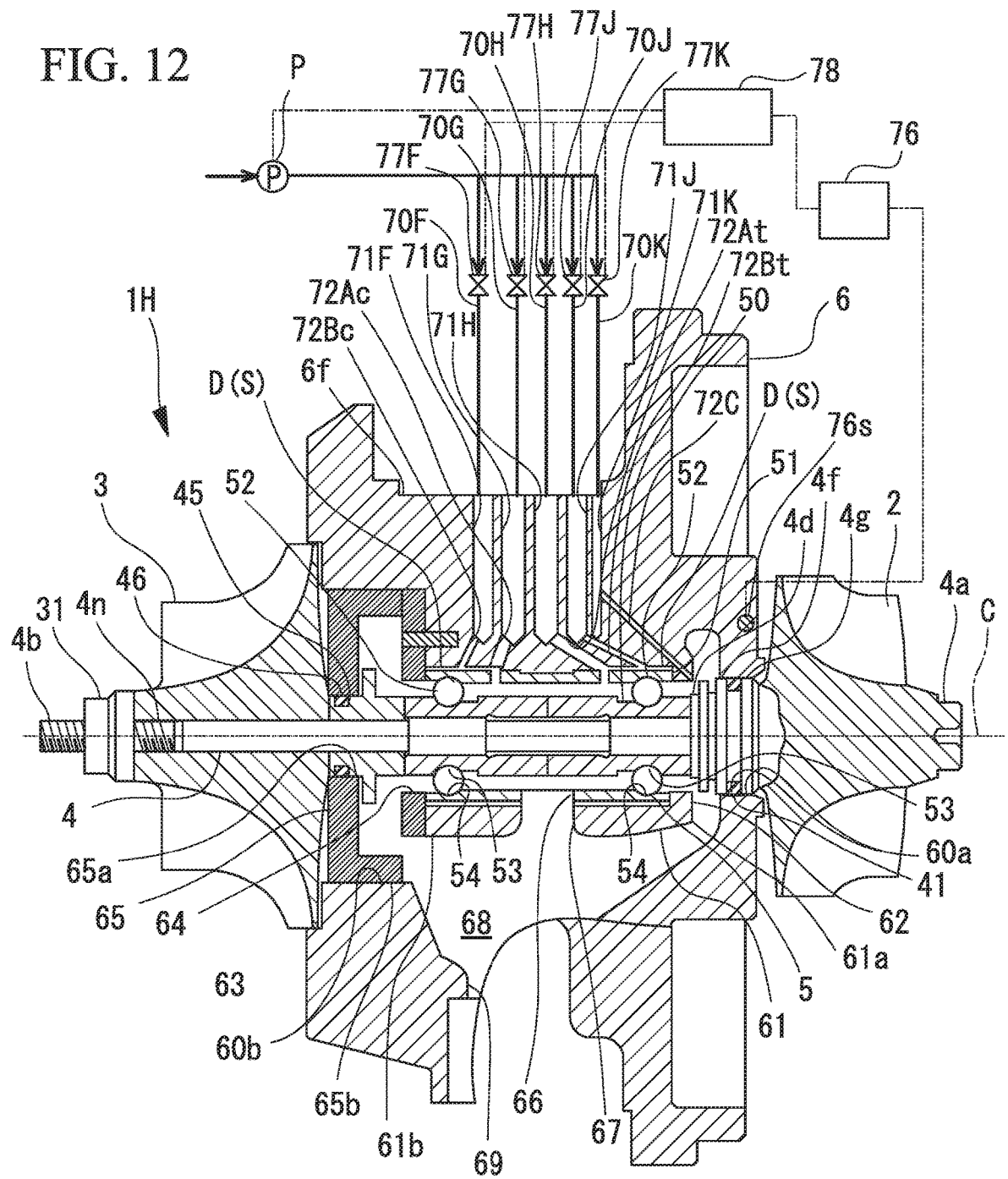
FIG. 12 is a cross-sectional view showing a constitution of a turbocharger according to a first modified example of the fifth embodiment of the present invention.

FIG. 12 is a cross-sectional view showing a constitution of a turbocharger according to the first modified example of the fifth embodiment of the present invention.

In a turbocharger 1H of an engine system 100H (refer to FIG. 8), as shown in FIG. 12, a housing 6 includes oil supply pipe connection ports 71F, 71G, 71H, 71J, and 71K. Lubricating oil supply pipes 70F, 70G 70H, 70J, and 70K for supplying lubricating oil from the outside of the housing 6 are connected to the oil supply pipe connection ports 71F, 71G, 71H, 71J, and 71K. The lubricating oil supply pipe 70F includes a control valve (lubricating oil adjustment part) 77F, the lubricating oil supply pipe 70G includes a control valve (lubricating oil adjustment part) 77G, the lubricating oil supply pipe 70H includes a control valve (lubricating oil adjustment part) 77H, the lubricating oil supply pipe 70J includes a control valve (lubricating oil adjustment part) 77J, and the lubricating oil supply pipe 70K includes a control valve (lubricating oil adjustment part) 77K.

The control valves 77F, 77G, 77H, 77J, and 77K are configured such that degrees of opening thereof can be individually adjusted under control of the controller 78 in accordance with an operation state or the like such as a temperature of the housing 6 or the number of revolutions of an engine 90 measured by sensors 76s and 76t (refer to FIG. 8) of an operation state detecting unit 76.

The controller 78 can control all flow rates of lubricating oil by controlling the number of revolutions of a pump P on the basis of a temperature of the housing 6 measured by the operation state detecting unit 76.

The controller 78 controls a degree of opening of the control valve 77F, 77G, 77H, 77J, or 77K and the number of revolutions of the pump P in the same manner as the method for controlling the turbocharger in the fifth embodiment shown in FIG. 10.

Figure 13:
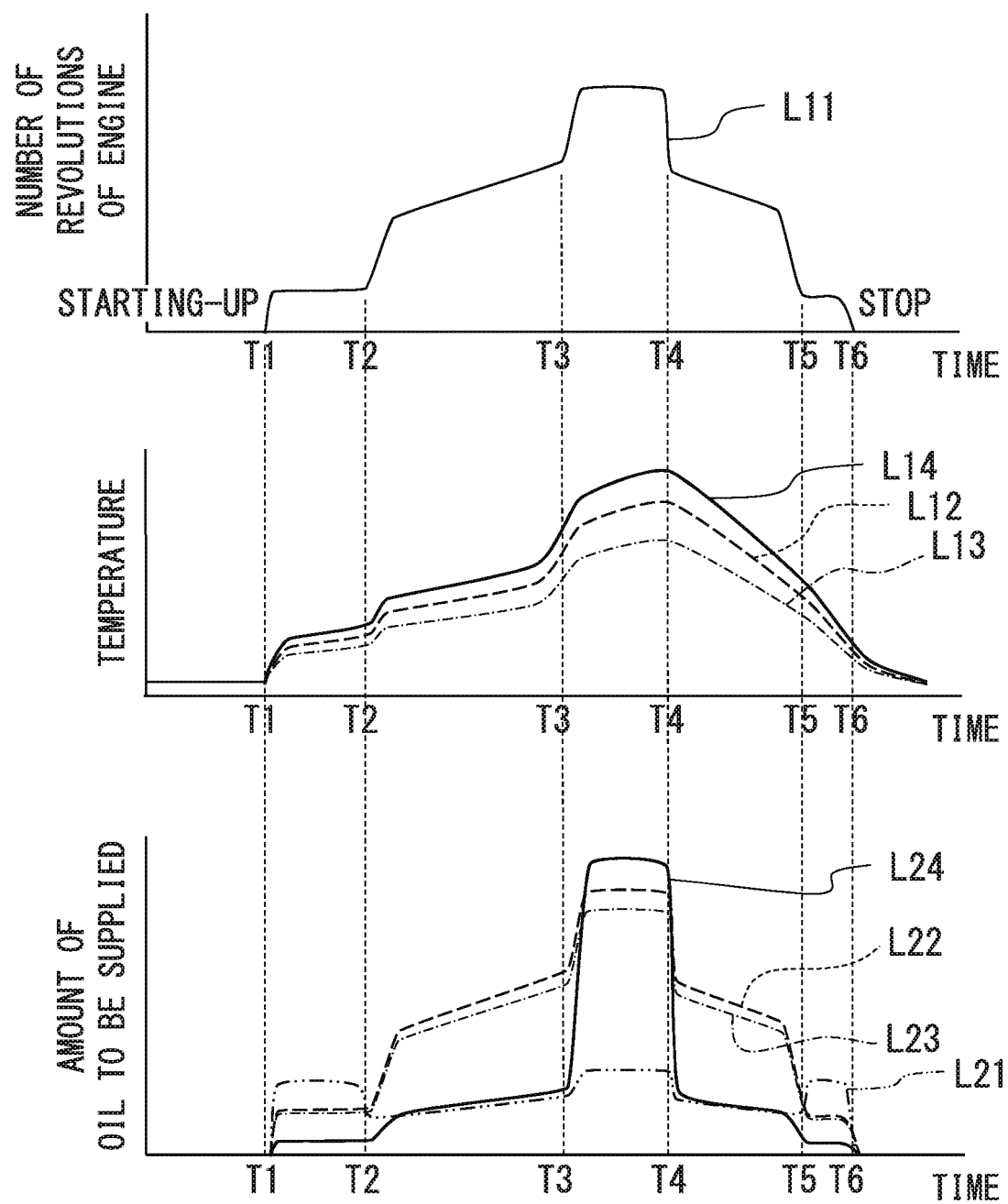
FIG. 13 is a diagram showing an example of the number of revolutions of an engine, a temperature of each part, and change in amount of oil supplied to each part with respect to an elapsed time when the turbocharger is operated by a method for controlling the turbocharger according to the first modified example of the fifth embodiment.

FIG. 13 is a diagram showing an example of the number of revolutions of an engine, the temperature of each part, and change in amount of oil supplied to each part with respect to an elapsed time when the turbocharger according to the first modified example of the fifth embodiment is operated.

It is assumed that the engine 90 is operated as in an engine speed change curve L11 shown in FIG. 13. In other words, after the engine 90 starts up at time T1, the number of revolutions of the engine gradually increases from time T2 and high-speed rotation is maintained from time T3. After that, the number of revolutions of the engine gradually decreases from time T4 to time T5 and the engine 90 stops at time T6.

When the engine 90 is operated in this way, a temperature of a rolling bearing 5 changes in conjunction with the number of revolutions of the engine 90 like in temperature change curves L12 and L13. Here, rolling bodies 52t of the rolling bearing 5 near a turbine wheel 2 indicated by the temperature change curve L12 are higher in temperature than rolling bodies 52c of the rolling bearing 5 near a compressor wheel 3 indicated by the temperature change curve L13.

The temperature of an oil ring 41 indicated by a temperature change curve L14 is higher in temperature than the rolling bearing 5 and the housing 6 and changes in conjunction with the number of revolutions of the engine 90.

On the other hand, the controller 78 increases a degree of opening of a control valve 77F or 77J when the housing 6 is at a low temperature immediately after the engine 90 is started and an elapsed time since starting-up of the engine 90 is short. Thus, sufficient lubricating oil is supplied to an oil film damper D, for example, as indicated by an oil supply amount change curve L21.

In addition, the controller 78 can increase a degree of opening of a control valve 77H to larger than that of a control valve 77G, for example, when the number of revolutions of the engine is high and the housing 6 is at a high temperature. Thus, more lubricating oil than that for the rolling bodies 52c indicated in an oil supply amount change curve L23 is supplied to the rolling bodies 52t of the rolling bearing 5 near the turbine wheel 2 as indicated in an oil supply amount change curve L22.

When the number of revolutions of the engine is high and the housing 6 is at a high temperature, the controller 78 can increase a degree of opening of the control valve 77K so that sufficient lubricating oil is supplied to the oil ring 41 as indicated in an oil supply amount change curve L24.

Also in the first modified example of the fifth embodiment, like in the fifth embodiment, when the turbocharger 1G is in operation, appropriate amounts of lubricating oil can be supplied to the rolling bodies 52 of the rolling bearing 5, the oil film damper D, and the oil ring 41 by more finely adjusting the lubricating oil in accordance with the temperature measurement results of the housing 6.

Second Modified Example of Fifth Embodiment

Figure 14:
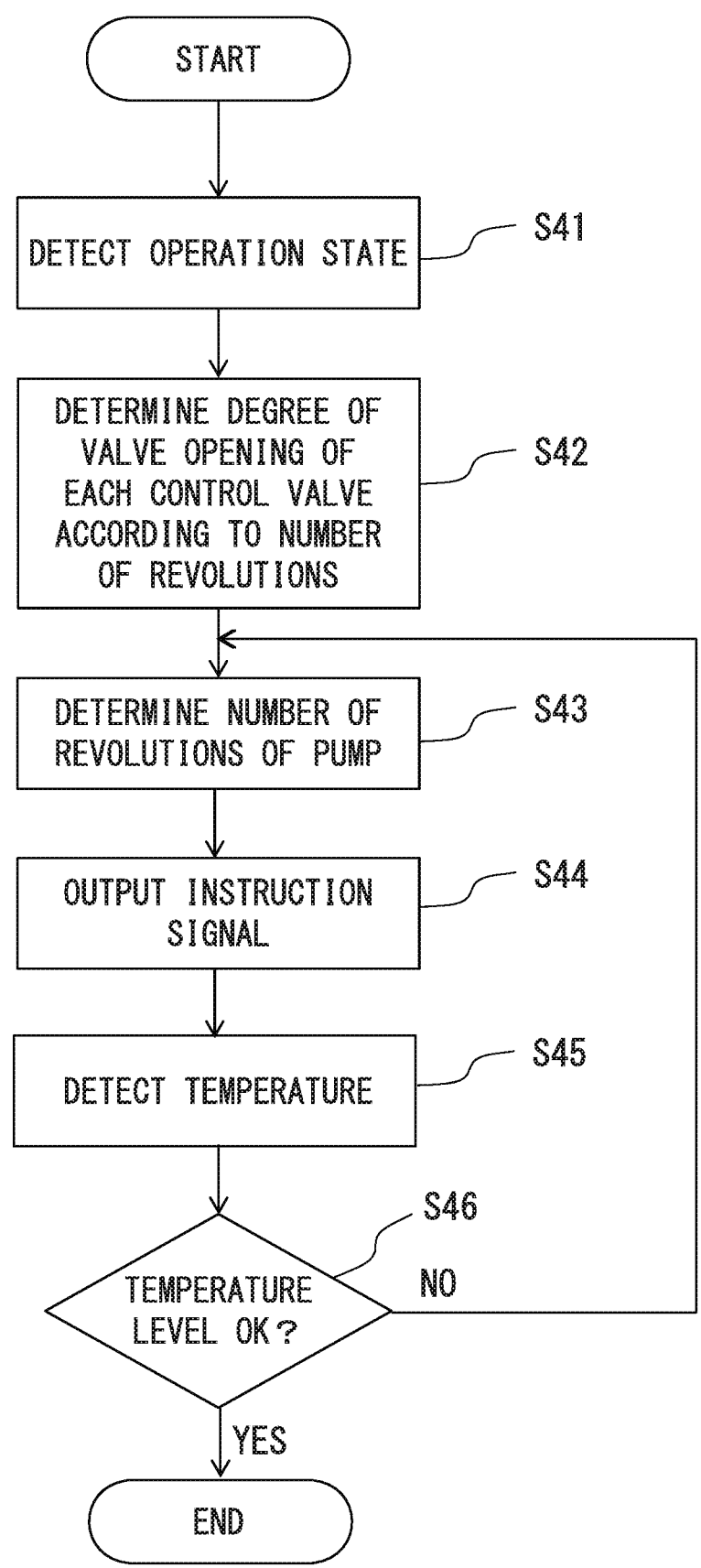
FIG. 14 is a diagram illustrating a flow of a method for controlling a turbocharger according to a second modified example of the fifth embodiment of the present invention.

FIG. 14 is a diagram showing a flow of a method for controlling a turbocharger according to a second modified example of the fifth embodiment of the present invention.

As shown in the fifth embodiment and the first modified example thereof, degrees of opening of a plurality of control valves 77A, 77B, 77C, 77F, 77G, 77H, 77J, and 77K are set to be different from each other in accordance with an operation state of a turbocharger 1G or 1H.

Thus, for example, the number of revolutions of the engine 90 can be associated with degrees of opening of the control valves 77A, 77B, 77C, 77F, 77G, 77H, 77J, and 77K and the association can be set in a controller 78 using a table, a map, a mathematical expression, or the like so that an amount of oil supplied to each part is a preset amount of oil supply in accordance with the number of revolutions of the engine 90.

As shown in FIG. 14, the controller 78 first detects an operation state of the turbocharger 1G or 1H from the number of revolutions of an engine 90 detected by a sensor 76t (refer to FIG. 8) of an operation state detecting unit 76 (Step S41).

Subsequently, the controller 78 determines the degree of opening of the control valve 77A, 77B, 77C, 77F, 77G, 77H, 77J, or 77K from information associated with the detected number of revolutions of the engine 90 (Step S42).

In addition, the controller 78 determines the number of revolutions of a pump P from the detected number of revolutions of the engine 90 (Step S43).

Subsequently, the controller 78 outputs the determined degree of opening of the control valve 77A, 77B, 77C, 77F, 77G, 77H, 77J, or 77K and the determined number of revolutions of the pump P as instruction signals (Step S44).

Lubricating oil is supplied using the control valves 77A, 77B, 77C, 77F, 77G, 77H, 77J, and 77K and the pump P based on the degree of opening and the number of revolutions output from the controller 78.

After that, a temperature of a housing 6 detected by a sensor 76s of the operation state detecting unit 76 is acquired (Step S45).

The controller 78 determines whether or not the detected temperature of the housing 6 is within a preset temperature level (within a predetermined temperature range) (Step S46). Here, the preset temperature level is set to be equal to or lower than an allowable temperature range which can be used in each of parts constituting each part in the housing 6, for example, parts which are at a high temperature such as the bearing 5 and the oil ring 41.

As a result of the determination in Step S46, the controller 78 ends the process if it is determined that the detected temperature of the housing 6 is within the preset temperature level.

The controller 78 causes the process to return to the process of Step S43 if it is determined that the detected temperature of the housing 6 is not within the preset temperature level and performs determination again to change the number of revolutions of the pump P. Subsequently, the controller 78 outputs the re-determined number of revolutions of the pump P as an instruction signal (Step S44) and performs an operation by changing the number of revolutions of the pump P. After that, the controller 78 detects the temperature of the housing 6 again using the sensor 76s (Step S45) and determines whether or not the detected temperature of the housing 6 is within a predetermined temperature level.

When the controller 78 simply sets a balance between degrees of opening of a plurality of control valves 77A, 77B, 77C, 77F, 77G, 77H, 77J, and 77K in Step S42 and then adjusts the number of revolutions of the pump P in this way, an operation can be performed in a state in which a temperature of each part of the turbochargers 1G and 1H is within an appropriate range.

Other Embodiments

The present invention is not limited to the above-described embodiments and a design can be changed without departing from the gist of the present invention.

Figure 15:
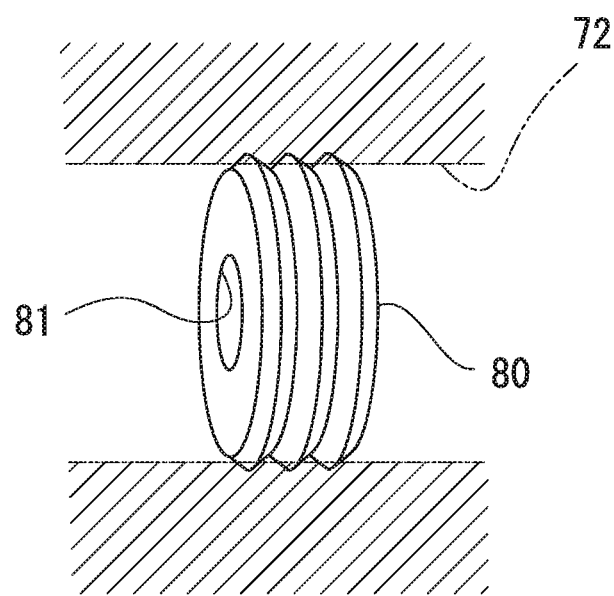
FIG. 15 is a modified example of the first to fifth embodiments of the present invention and is a perspective view showing an orifice used for changing a flow rate of lubricating oil.

For example, although the cross-sectional areas of the supply flow paths 72A, 72Ac, 72At, 72B, 72Bc, 72Bt, and 72C are set to be different from each other in the above-described embodiments and modified examples, the present invention is not limited thereto. For example, orifices 80 having opening holes 81 through which lubricating oil passes as shown in FIG. 15 may be provided in a supply flow path 72. In this case, a plurality of kinds of orifices 80 having the opening holes 81 with different inner diameters are used. A flow rate of lubricating oil is adjusted by changing each of the inner diameters of the opening holes 81 of the orifices 80 installed in the supply flow path 72.

Also, for example, operation states of turbochargers 1G and 1H serving as a reference for adjusting a degree of opening of each of an automatic adjustment valve 75 or control valves 77A, 77B, 77C, 77F, 77G, 77H, 77J, and 77K are not limited to those exemplary example described above and may be other information.

The constitution of a rolling bearing 5 is not limited to those shown in the embodiments and the modified examples thereof and can be other appropriate constitutions.

In the embodiments and the modified examples thereof, a constitution in which only one rolling bearing 5 is provided is adopted. However, the number of rolling bearings 5 provided is not limited to one. For example, a plurality of rolling bearings may be arranged in series in a central axis direction of a rotating shaft 4.

The constitution of a turbocharger is not limited to the above-described constitutions of the embodiments and the modified examples thereof and can be other appropriate constitutions.

The constitutions shown in the embodiments and the modified examples thereof can be appropriately combined.

INDUSTRIAL APPLICABILITY

When a plurality of lubricating oil supply lines for supplying lubricating oil at different state quantities are provided at different locations in a housing, the appropriate amount of lubricating oil can be supplied to each part of a turbocharger.

REFERENCE SIGNS LIST 1A, 1B, 1C, 1D, 1E, 1F, 1G, 1H turbocharger
2 turbine wheel
3 compressor wheel
4 rotating shaft
4a first end
4b second end
4d large diameter part
4f, 4g flange
4n threaded portion
5 rolling bearing
6 housing
6f outer circumferential surface
31 nut
41 oil ring 45 bush
46 oil ring
50 inner race
51 outer race
52, 52c, 52t rolling body
53, 54 raceway groove
60a opening
61 accommodation part
61a end
61b end
62 thrust receiving part
63 thrust receiving member
64 opening
65 plate
65a opening
65b circumferential wall
66, 67 discharge flow path
68 oil discharge chamber
69 oil discharge port
70A to 70F lubricating oil supply pipe
71A to 71H, 71J, 71K oil supply pipe connection port
72A, 72Ac, 72At supply flow path (first lubricating oil supply line, lubricating oil supply line)
72B, 72Bc, 72Bt supply flow path (second lubricating oil supply line, lubricating oil supply line)
72C supply flow path (third lubricating oil supply line, lubricating oil supply line)
73 oil cooler (cooling device)
74 lubricating oil introduction hole
75A to 75C automatic adjustment valve (lubricating oil adjustment part)
76 operation state detecting unit
76s sensor
77A to 77C, 77E to 77H, 77J, 77K control valve (lubricating oil adjustment part)
78 controller (control unit)
80 orifice
81 opening hole
90 engine
100G, 100H engine system
L1 solid line
L11 engine revolution number change curve
L12, L13, L14 temperature change curve
L2 broken line
L21, L22, L23, L24 oil supply amount change curve
L3 alternate long and two short dash line
C central axis (axis)
D, Dc, Dt oil film damper
P pump
S gap

The invention claimed is:

1. A turbocharger assembly comprising:
a rotating shaft which extends along an axis;
a turbine wheel which is provided on a first end side of the rotating shaft;
a compressor wheel which is provided on a second end side of the rotating shaft;
a rolling bearing which includes an inner race fixed to an outer circumferential surface of the rotating shaft, an outer race arranged to surround the inner race from an outside in a radial direction, and rolling bodies arranged between the inner race and the outer race that rotatably supports the rotating shaft around the axis;
a housing which is arranged to cover the rolling bearing from an outer circumferential side with a gap between the housing and an outer circumferential surface of the rolling bearing; and
a first lubricating oil supply pipe and a second lubricating oil supply pipe through which lubricating oil is supplied to different locations in the housing,
wherein the first lubricating oil supply pipe is connected to a compressor side oil supply pipe connection port formed in the housing through which the lubricating oil is supplied, the first lubricating oil supply pipe supplies the lubricating oil to compressor side lubricating oil supply lines that branch off from the compressor side oil supply pipe connection port and is disposed on a side in the housing near the compressor wheel; and
wherein the second lubricating oil supply pipe is connected to a turbine wheel side oil supply pipe connection port formed in the housing through which the lubricating oil is supplied, the second lubricating oil supply pipe supplies the lubricating oil to turbine side lubricating oil supply lines that branch off from the turbine wheel side oil supply pipe connection port and is disposed on a side in the housing near the turbine wheel,
wherein the second lubricating oil supply pipe located on the side closer to the turbine wheel includes a cooling device configured to cool the lubricating oil, and
wherein the lubricating oil in the turbine side lubricating oil supply lines is supplied at a lower temperature than the lubricating oil in the compressor side lubricating oil supply lines.

2. The turbocharger assembly according to claim 1, wherein the compressor side lubricating oil supply lines includes:
a compressor side first lubricating oil supply line through which the lubricating oil is supplied to a space between the outer race and the inner race of the rolling bearing, and
a compressor side second lubricating oil supply line through which the lubricating oil is supplied to the gap; and
the turbine side lubricating oil supply lines includes:
a turbine side first lubricating oil supply line through which the lubricating oil is supplied to the space between the outer race and the inner race of the rolling bearing,
a turbine side second lubricating oil supply line through which the lubricating oil is supplied to the gap, and
a third lubricating oil supply line through which the lubricating oil is supplied to an oil ring provided between an opening formed in the housing and the rotating shaft.

3. The turbocharger assembly according to claim 1, comprising:
an operation state detecting unit including sensors and a general purpose computer/processor, and which is configured to detect an operation state of the turbocharger.

4. The turbocharger assembly according to claim 3, comprising:
a control unit including a general purpose computer/processor, and which is configured to control the cooling device on the basis of the operation state detected by the operation state detecting unit.

5. The turbocharger assembly according to claim 4, wherein the operation state detecting unit is configured to detect a temperature of the housing as the operation state.

6. An engine system comprising:
the turbocharger assembly according to claim 4; and
an engine which is supercharged by the turbocharger,
wherein the operation state detecting unit is configured to detect an operation state of the engine.

7. The engine system according to claim 6, wherein the operation state detecting unit is configured to detect a number of revolutions of the engine.

* * * * *